United States Patent
Murahashi et al.

(10) Patent No.: US 8,428,818 B2
(45) Date of Patent: *Apr. 23, 2013

(54) LUBRICANT OIL STATE WARNING DEVICE FOR A WORKING VEHICLE

(75) Inventors: Takayoshi Murahashi, Tsuchiura (JP); Toshikazu Minoshima, Kasumigaura (JP); Takao Kurosawa, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 663 days.

This patent is subject to a terminal disclaimer.

(21) Appl. No.: 12/633,190

(22) Filed: Dec. 8, 2009

(65) Prior Publication Data

US 2010/0191417 A1 Jul. 29, 2010

(30) Foreign Application Priority Data

Jan. 28, 2009 (JP) .................................. 2009-16660

(51) Int. Cl.
- G06F 7/00 (2006.01)
- F01M 1/00 (2006.01)
- B60K 1/00 (2006.01)
- B60K 17/00 (2006.01)

(52) U.S. Cl.
USPC ................ 701/36; 701/50; 184/26; 180/65.6; 180/339

(58) Field of Classification Search ............... 701/36, 701/50; 184/26; 180/339, 65.6
See application file for complete search history.

(56) References Cited

U.S. PATENT DOCUMENTS

| | | | | |
|---|---|---|---|---|
| 2,974,304 A | * | 3/1961 | Nordlund | 340/904 |
| 4,316,175 A | * | 2/1982 | Korber et al. | 246/169 A |
| 4,799,564 A | | 1/1989 | Iijima et al. | |
| 8,155,834 B2 | * | 4/2012 | Murahashi | 701/36 |
| 8,160,773 B2 | * | 4/2012 | Nabeshima et al. | 701/36 |

FOREIGN PATENT DOCUMENTS

| | | |
|---|---|---|
| JP | 62-221918 A | 9/1987 |
| JP | 2006-264394 A | 10/2006 |

OTHER PUBLICATIONS

U.S. Appl. No. 12/631,252, filed Dec. 4, 2009 in the name of Yoshifumi Nabeshima et al.

* cited by examiner

*Primary Examiner* — Fadey Jabr
*Assistant Examiner* — Navdeep Mand
(74) *Attorney, Agent, or Firm* — Mattingly & Malur, PC

(57) ABSTRACT

When the drive of a lubricant pump (46) is stopped to prevent the lubricant pump (46) from assuming an idling state, a determination is made as to whether or not a temperature difference ($\Delta T$) between the temperature (T) of a lubricant oil detected earlier by a temperature sensor (51) and a warning temperature (Toh) is equal to or lower than a predetermined threshold value ($\alpha$). When the temperature difference ($\Delta T$) is within the threshold value ($\alpha$), an "overheat" warning is issued to an operator of a dump truck (1). In consequence, even in a case where a temperature sensor (51) is provided on the output side of the lubricant pump (46) by being located on an outer side of a wheel mounting case (19), planetary gear reduction mechanisms (23), (31) inside the wheel mounting case (19) can be prevented from overheating by warning the operator of the vehicle.

14 Claims, 12 Drawing Sheets

LUBRICANT OIL STATE WARNING DEVICE FOR A WORKING VEHICLE

BACKGROUND ART

1. Field of the Invention

The present invention relates to a travel drive apparatus for a working vehicle such as a large-size transportation vehicle and dump truck which is suitably used in transporting crushed stones excavated from a mine or the like.

2. Description of the Prior Art

Generally, large-size transportation vehicles, called dump trucks, have a liftable vessel (a loading platform) on a frame of a vehicle body, and carry heavy objects to be transported like crushed stones in a state in which the objects to be transported are loaded in a large quantity on the vessel.

In this regard, for example, a travel drive apparatus which is adapted to drive a drive wheel of a dump truck is provided with a tubular axle housing which is mounted on a vehicle body, a drive source such as an electric motor or a hydraulic motor which is provided in the axle housing and rotationally drives a rotational shaft, a wheel mounting case rotatably mounted around an outer periphery on the fore end side of the axle housing through a bearing to support a drive wheel thereon for traveling, and a multi-stage reduction gear mechanism incorporated into the wheel mounting case and is adapted to reduce the speed of rotation of the rotational shaft so as to transmit this rotation to the wheel mounting case (Japanese Patent Laid-Open No. S62-221918 A and 2006-264394 A).

By a multi-stage reduction gear mechanism of this sort, rotational output of a drive source like an electric motor, for example, is reduced in speed and transmitted to a tubular wheel mounting case (wheel) to generate a large rotational torque in a drive wheel of a dump truck, namely in a front or rear wheel to thereby enhance the transporting performance of the dump truck (vehicle). In addition, a travel drive apparatus for a dump truck is normally adapted to rotationally drive left and right wheels by respective reduction gear mechanisms independently of each other.

In order to keep each gear member of the reduction gear mechanism in a lubricated state, the lubricant oil is pooled in a tubular wheel mounting case on which a drive wheel is to be mounted. Further, this lubricant oil is forcibly circulated in and outside the wheel mounting case (axle housing) by using a lubricant pump. Moreover, the lubricant oil is cooled by being subjected to heat exchange by an oil cooler provided in the course of a circulation line.

In this case, for example, a lubricant pump is located on the outer side of the axle housing. A suction pipe is provided by being connected to a suction side of the lubricant pump, with the one side (suction port side) of the suction pipe being extended into and immersed in the lubricant oil pooled in the wheel mounting case. On the other hand, an output pipe or a supply pipe is provided by being connected to the output side of the lubricant pump, and the other side of the supply pipe is disposed so as to be extended into the wheel mounting case at a position above the suction pipe.

Incidentally, with the above-described conventional art, if the travel speed of the vehicle is increased by rotating the wheels at high speed, the lubricant oil pooled in the wheel mounting case is subjected to the influence of centrifugal force accompanying the rotation of that wheel mounting case. For this reason, the lubricant oil behaves in such a manner as to stick to the entire periphery of the inner wall surface of the wheel mounting case, and hence there are cases where the surface level of the lubricant oil drops to a position lower than the suction port of the suction pipe.

Accordingly, when the travel speed of the working vehicle is increased to cause the suction port of the suction pipe disposed in the wheel mounting case to become located away from the surface level of the lubricant oil, the action of sucking the lubricant oil by the lubricant pump becomes impossible. As a result, the lubricant pump assumes an idling state and is driven dry, so that seals, bearings, and the like of the lubricant pump are likely to become worn and damaged at an early period, causing the pump life to become shortened.

Accordingly, in order to prevent the lubricant pump from assuming the idling state, the present inventors studied the feasibility of immediately stopping the drive of the lubricant pump when the travel speed of the vehicle has become faster than a predetermined determination speed. However, if the high-speed travel of the working vehicle is continued even after the operator of the working vehicle has stopped the lubricant pump, the temperature of the lubricant oil rises, so that there is a problem in that overheating can undesirably result in some cases.

In particular, the configuration provided is such that a reduction gear mechanism is provided in the aforementioned wheel mounting case, and the lubricant oil is pooled in the interior. For this reason, it is, in practice, difficult to provide a temperature sensor, inside the wheel mounting case to directly detect the temperature of the lubricant oil, since structural restrictions are large.

For this reason, the present inventors studied the feasibility of providing the temperature sensor on the output side of the lubricant pump by being located outside the wheel mounting case. In this case, however, when the lubricant pump is stopped, it is impossible to detect the temperature of the lubricant oil with the temperature sensor. In addition, if the travel of the vehicle is continued after the stop of the lubricant pump, there is a problem in that the temperature of the lubricant oil unfavorably rises further.

SUMMARY OF THE INVENTION

In view of the above-discussed problem with the prior art, it is an object of the present invention to provide a travel drive apparatus for a working vehicle in which a temperature difference is determined between the temperature of the lubricant oil detected by the temperature sensor before stopping the lubricant pump and a predetermined warning temperature, and a warning is issued when it is determined that this temperature difference is within a predetermined threshold value range, thereby making it possible to prevent overheating and enhance the reliability and service life of the apparatus.

(1) In order to achieve the above-described object, according to the present invention, there is provided a travel drive apparatus for a working vehicle, comprising: a tubular wheel mounting case provided on a working vehicle and rotating integrally with a wheel; a reduction gear mechanism provided in the wheel mounting case to reduce the speed of rotation of a drive source and transmit it to the wheel mounting case; lubricant oil circulation means for supplying a lubricant oil to the reduction gear mechanism; a temperature sensor for detecting a temperature of the lubricant oil; and a speed sensor for detecting a rotational speed of the wheel.

The present invention is characterized in that the lubricant oil circulation means is constituted by an electric motor, a lubricant pump for forcibly circulating the lubricant oil pooled in the wheel mounting case by being driven by the electric motor, and control means for controlling the drive and stop of the electric motor in accordance with the rotational speed of the wheel, and the control means comprises: motor stop means for stopping the drive of the electric motor when the speed of the wheel detected by the speed sensor has become faster than a predetermined determination speed; temperature difference determination means for comparing the temperature of the lubricant oil detected by the temperature sensor and a predetermined warning temperature and determining whether or not a temperature difference between them is within a range of a predetermined threshold value when the electric motor is stopped by the motor stop means; and warning signal output means for outputting a signal for warning that a temperature state of the lubricant oil or a traveling state is not normal, when it is determined by the temperature difference determination means that the temperature difference is within the range of the threshold value.

With the arrangements just described, since the control means constituting a part of the lubricant oil circulation means is configured to control the drive and stop of the electric motor in accordance with the rotational speed of the wheel, the lubricant pump can be started by driving the electric motor when the rotational speed of the wheel (travel speed of the vehicle) is lower than a predetermined determination speed, thereby forcibly circulating the lubricant oil pooled in a wheel mounting case. In consequence, the temperature of the lubricant oil which flows through circulation lines including the wheel mounting case can be lowered by using an oil cooler, and the lubricant oil whose temperature is low can be supplied to the reduction gear mechanism inside the wheel mounting case, thereby making it possible to enhance the lubrication performance and cooling performance.

On the other hand, in this state, when the rotational speed of the wheel has become faster than the determination speed, the lubricant oil in the wheel mounting case behaves in such a manner as to stick to the entire periphery of the inner wall surface of the wheel mounting case under the influence of the centrifugal force, so that there is a possibility that the action of sucking the lubricant oil by the lubricant pump becomes impossible. Accordingly, in such a case, the control means stops the drive of the lubricant pump by the electric motor and makes it possible to prevent the lubricant pump from assuming an idling state and continuing dry operation.

Moreover, when the lubricant pump is stopped by the electric motor, a determination can be made by the temperature difference determination means as to whether or not the temperature difference between the temperature of the lubricant oil detected by the temperature sensor and a predetermined warning temperature is within a range of a predetermined threshold value. Then, when it is determined by the temperature difference determination means that the aforementioned temperature difference is within the range of the threshold value, a warning can be issued by outputting a warning signal from the warning signal output means. In consequence, a warning that the temperature state of the lubricant oil or the traveling state is not normal (namely, an "overheat" or "excess speed" warning) can be issued to the operator of the working vehicle, notifying the operator of the vehicle that the travel speed of the vehicle should be lowered.

(2) According to the present invention, the control means is configured to resume the drive of the electric motor when the speed of the wheel has been lowered to a speed which is equal to or less than the determination speed in accordance with the warning by the warning signal output means.

By virtue of this configuration, when the operator of the working vehicle has lowered the rotational speed of the wheel (travel speed of the vehicle) to a level equal to or less than the determination speed in accordance with the warning of "overheat" or "excess speed", it is possible to operate the lubricant pump again by driving the electric motor, thereby making it possible to forcibly circulate the lubricant oil pooled in the wheel mounting case. In consequence, it is possible to lower the temperature of the lubricant oil by using the oil cooler and supply the lubricant oil whose temperature is low to the planetary gear reduction mechanism inside the wheel mounting case, thereby making it possible to enhance the lubrication performance and cooling performance.

(3) According to the present invention, the control means further comprises: delay time set means for setting a predetermined delay time when it is determined by the temperature difference determination means that the temperature difference is within the range of the threshold value, and the warning signal output means is configured to issue the warning after the lapse of the delay time set by the delay time set means.

In consequence, when it is determined that the temperature of the lubricant oil is within the range of the aforementioned threshold value despite the fact that the temperature of the lubricant oil is lower than the warning temperature by, for example, 5° C. or thereabouts, it is possible to prevent a warning from being issued immediately by the warning signal output means and prevent an excess burden from being imposed on the operator. In addition, by issuing a warning after the lapse of the predetermined delay time, a timely warning can be provided to the operator.

(4) Further, according to the present invention, the delay time set means is configured to set the delay time to be long when the temperature difference falling within the threshold value is large, and is configured to set the delay time to be short when the temperature difference is small. In consequence, it is possible to set a delay time corresponding to the temperature difference between the temperature of the lubricant oil and the warning temperature. It is possible to issue an overheat warning when the delay time has elapsed, so that the operator can be notified of an overheat warning corresponding to the actual temperature of the lubricant oil.

(5) Meanwhile, according to the present invention, the warning signal output means outputs a warning signal to warn that the temperature of the lubricant oil is in an overheated state. In this case, it is possible to warn that the temperature of the lubricant oil is in an overheated state by the warning signal from the warning signal output means, so that the operator can be prompted to lower the travel speed of the vehicle to a speed which is equal to or less than the aforementioned determination speed.

(6) Further, according to the present invention, the warning signal output means outputs a warning signal to warn that the travel speed of the vehicle is in a state of excess speed. In this case, the operator can be notified more directly that the travel speed of the vehicle should be lowered.

(7) Further, according to the present invention, a tubular axle housing extending in left and right directions is provided on a lower portion of a vehicle body for constituting the working vehicle, a pair of the wheel mounting cases are respectively provided rotatably on outer peripheral sides of both end sides in the left and right directions of the axle housing, and the lubricant oil is pooled at a lower position in each of the wheel mounting cases.

(8) Furthermore, according to the present invention, the lubricant oil circulation means includes a suction pipe for sucking the lubricant oil in the wheel mounting case by the lubricant pump and a supply pipe for supplying and circulating the lubricant oil sucked by the lubricant pump into an interior of the wheel mounting case; and the suction pipe extends from an interior of the axle housing into the interior of the wheel mounting case, its suction port being opened in the lubricant oil pooled at a lower position of the wheel mounting case.

BRIEF DESCRIPTION OF THE DRAWINGS

In the accompanying drawings:

FIG. 5 is an enlarged sectional view taken from the direction of arrows V-V in FIG. 4, showing the tubular spindle, wheel mounting case, suction pipe, and the like;

FIG. 6 is a control block diagram of a vehicle controller and the like for effecting supply control of a lubricant oil, overheat warning, and the like;

DETAILED DESCRIPTION OF THE INVENTION

Hereafter, with reference to the accompanying drawings, a detailed description will be given of the travel drive apparatus for a working vehicle in accordance with an embodiment of the present invention by citing as an example a case in which the present invention is applied to a rear drive type dump truck.

FIGS. 1 to 7 show a first embodiment of the travel drive apparatus for a working vehicle in accordance with the invention.

Figure 1:
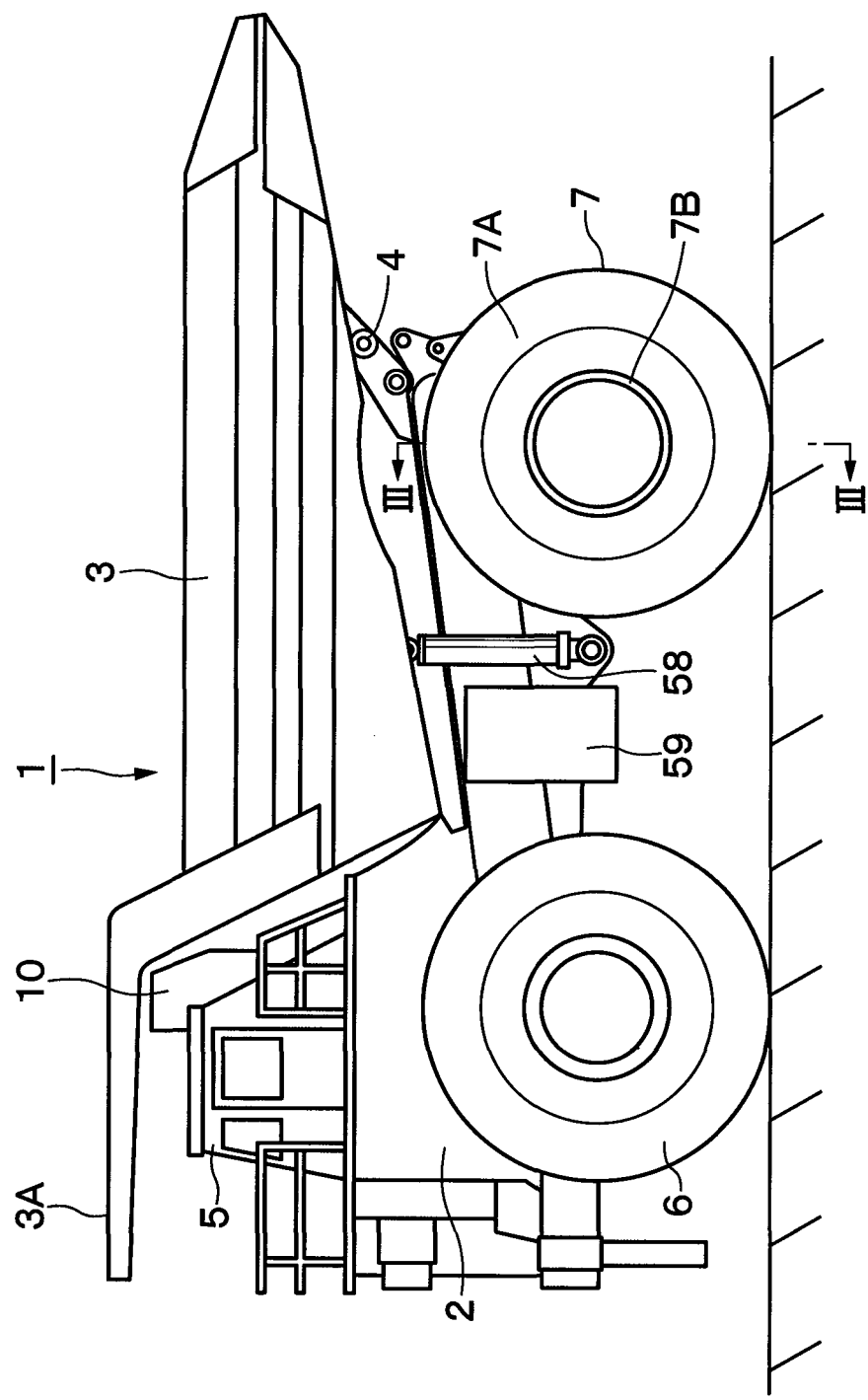
FIG. 1 is a front view of a dump truck incorporating a travel drive apparatus according to a first embodiment of the present invention.

In the drawings, indicated at 1 is a dump truck as a typical working vehicle. As shown in FIG. 1, the dump truck 1 is built with a sturdy frame structure, and largely constituted by an automotive vehicle body 2 with below-described front and rear wheels 6 and 7 serving as wheels, and a vessel 3 which is liftably mounted on the vehicle body 2 as a load-carrying platform.

Further, the vessel 3 is formed as a large-size container whose overall length reaches as much as 10 to 13 meters to load a large volume of heavy load such as crushed stones or other similar objects, and its rear side bottom portion is liftably (tiltably) coupled to a rear end side of the vehicle body 2 by using a pin coupling portion 4. Further, a protector 3A is projected forward from a front top of the vessel 3 in such a way as to cover a cabin 5 from upper side, which will be described hereinafter.

Indicated at 5 is the cabin provided on the front portion of the vehicle body 2 by being located on the lower side of the protector 3A. The cabin 5 defines an operating room to be occupied by an operator of the dump truck 1, and internally equipped with an operator's seat, a start-up switch, an accelerator pedal, a brake pedal, and a steering handle along with a plural number of control levers (none of which are shown in the drawings).

The protector 3A of the vessel 3 is arranged to cover the cabin 5 almost entirely from upper side to protect the latter from flying stones or rocks, and to protect an operator in the cabin 5 in case of an overturn accident of the vehicle (the dump truck 1).

Indicated at 6 are left and right front wheels which are rotatably mounted on low front portions of the vehicle body 2. Each one of the front wheels 6 constitutes a steering wheel which is steered by an operator of the dump truck 1 (by steering actions). Similarly to rear wheels 7 which will be described below, the front wheels 6 are large in diameter (in outside tire diameter), for example, as large as 2 to 4 meters.

Indicated at 7 are left and right rear wheels which are rotatably mounted on low rear portions of the vehicle body 2. Each one of the rear wheels 7 constitutes a drive wheel of the dump truck 1, and is rotationally driven integrally with a wheel mounting case 19 by a travel drive apparatus 11 of FIGS. 3 and 4, which will be described hereinafter. Each one of the rear wheels 7 is constituted by a tire 7A and a rim 7B which is arranged to be disposed at the inner side of the tire 7A.

Figure 2:
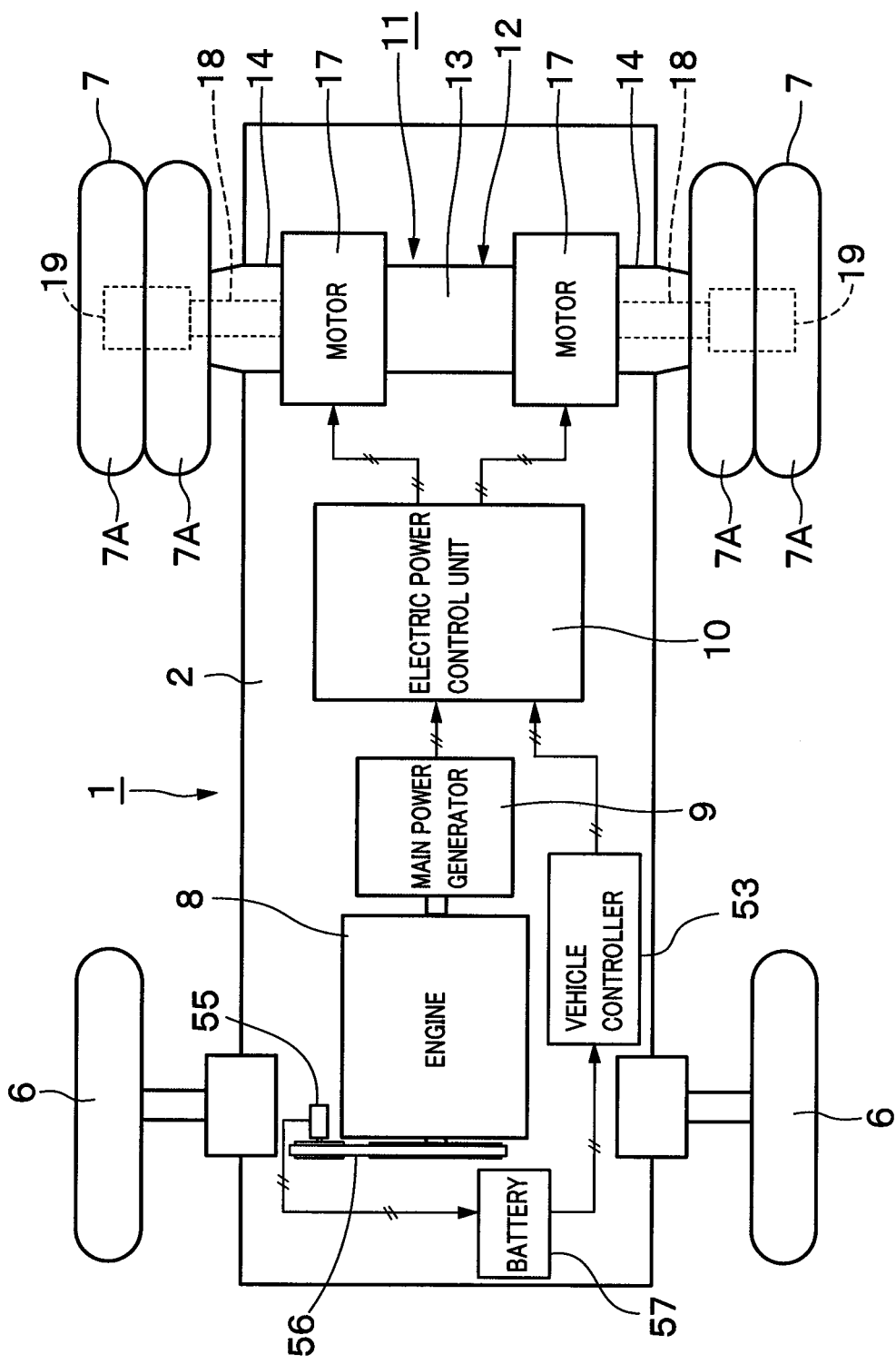
FIG. 2 is a configuration diagram of the travel drive apparatus of the dump truck.

Denoted at 8 is an engine which is mounted on the vehicle body 2 under the cabin 5 to serve as a prime mover. This engine 8 is, for example, a large Diesel engine, and drives a main power generator 9 as shown in FIG. 2 to generate a three-phase alternating current (for example, of approximately 1500 kW), as well as an auxiliary power generator 55 for direct current which will be described hereinafter. Further, the engine 8 plays a role of rotationally driving a hydraulic pump of a hydraulic pressure source (not shown) to supply hydraulic oil to and from a below-described hoist cylinder 58 and a steering cylinder (not shown) of a power steering system as well.

Indicated at 10 is an electric power control unit which controls electric power supply to the dump truck 1 together with a vehicle controller 53 which will be described hereinafter. As shown in FIG. 1, the electric power control unit 10 is constituted by a power distribution control board which is erected on the vehicle body 2 at one side of the cabin 5. Further, as shown in FIG. 2, the electric power control unit 10 functions to output electric power generated by the main power generator 9 to a wheel drive motor 17 and a pump drive motor 47 (see FIG. 6) and the like, which will be described hereinafter, according to a control signal from a below-described vehicle controller 53. Rotational speeds of the left and right wheel drive motors 17 in FIG. 2 are controlled separately by feedback control.

Next, with reference to FIGS. 3 and 4, a description will be given of the configuration of the travel drive apparatus 11 provided on the rear wheel 7 side of the dump truck 1.

The travel drive apparatus 11 is constituted by an axle housing 12, wheel drive motor 17, wheel mounting case 19 and two-stage planetary gear reduction mechanisms 23 and 31, which will be described hereinafter. The travel drive apparatus 11 is adapted to reduce the rotational speed of the wheel drive motor 17 through the two-stage planetary gear reduction mechanisms 23 and 31 to drive the rear wheel 7, which is a drive wheel of the vehicle, with a large rotational torque together with the wheel mounting case 19.

Designated at 12 is an axle housing for the rear wheel 7, provided under a rear portion of the vehicle body 2. As shown in FIG. 2, the axle housing 12 is formed in a tubular body which is extended in the axial direction between the left and right rear wheels 7 (in left and right directions). More specifically, the axle housing 12 is composed of an intermediate suspension tube 13 which is attached to the lower side of a rear portion of the vehicle body 2 through a shock absorber (not shown), and a motor accommodating tube 14 and a tubular spindle 15 which are provided at left and right ends of the suspension tube 13 respectively, as described hereinafter.

Designated at 14 is a pair of motor accommodating tubes 14 provided on both end sides of the suspension tube 13, respectively. As shown in FIG. 3, each motor accommodating tube 14 is formed in a tubular body of a round tubular shape and securely fixed at its inner axial end (at its base end side) to the suspension tube 13 by means of bolts, as shown in FIG. 2. Further, as shown in FIGS. 3 and 4, the below-described tubular spindle 15 is detachably fixed to the fore end side (outer axial end) of the motor accommodating tube 14 by means of bolts 16. A wheel drive motor 17 is accommodated in the motor accommodating tube 14 to serve as a drive source of the rear wheel 7, which will be described hereinafter.

Indicated at 15 is a tubular spindle which constitutes an opening portion on a fore end side of the axle housing 12. As shown in FIGS. 3 and 4, the tubular spindle 15 is formed in a tubular body of a tapered shape, and fixed to the motor accommodating tube 14 by the bolts 16 at a large diameter portion 15A at one axial end thereof (base end side). Further, the fore end side (outer axial end side) of the tubular spindle 15 forms a small diameter tubular portion 15B, and a final-stage carrier 36, which will be described hereinlater, is fixed on the inner periphery of an opening end portion of the small diameter tubular portion 15B.

A wheel mounting case 19 for a rear wheel 7 is mounted on the outer peripheral surface of the small diameter tubular portion 15B of the tubular spindle 15 through bearings 20 and 21, which will be described hereinafter. Thus, the wheel mounting case 19 is rotatably supported on the small diameter tubular portion 15B of the tubular spindle 15. Namely, the tubular spindle 15 is formed as a sturdy body in the shape of a tapered stepped tube, and is capable of supporting the wheel mounting case 19 (rear wheel 7) on the outer peripheral side of the small diameter tubular portion 15B with high rigidity (high strength).

On the other hand, a plural number of mounting seats 15C projecting radially inward (only one of which is shown in the drawing) are integrally formed on the inner peripheral side of the large diameter portion 15A of the tubular spindle 15, and a below-described wheel drive motor 17 is mounted by being fixed on the mounting seats 15C by the use of bolts. As shown in FIGS. 3 and 4, an annular mounting portion 15D projecting radially inward is provided on an inner peripheral side of the tubular spindle 15 at a position between the large diameter portion 15A and the small diameter tubular portion 15B to mount thereon a partition wall 37, which will be described hereinafter. Further, a radial hole 15E is bored in a lower side portion of the small diameter tubular portion 15B of the tubular spindle 15 to lead out a suction pipe 42, which will be described hereinafter, in a radially outward direction (i.e., in a downward direction).

Indicated at 17 are left and right wheel drive motors as a drive source which are detachably provided in the respective tubular spindles 15 of the axle housing 12. Each wheel drive motor 17 is constituted by a large electric motor, and rotationally driven by electric power which is supplied from the electric power control unit 10. Further, as shown in FIG. 2, for rotationally driving the left and right rear wheels 7 independently of each other, the wheel drive motors 17 are accommodated respectively in the left and right motor accommodating tubes 14 at the opposite sides of the axle housing 12.

Figure 3:
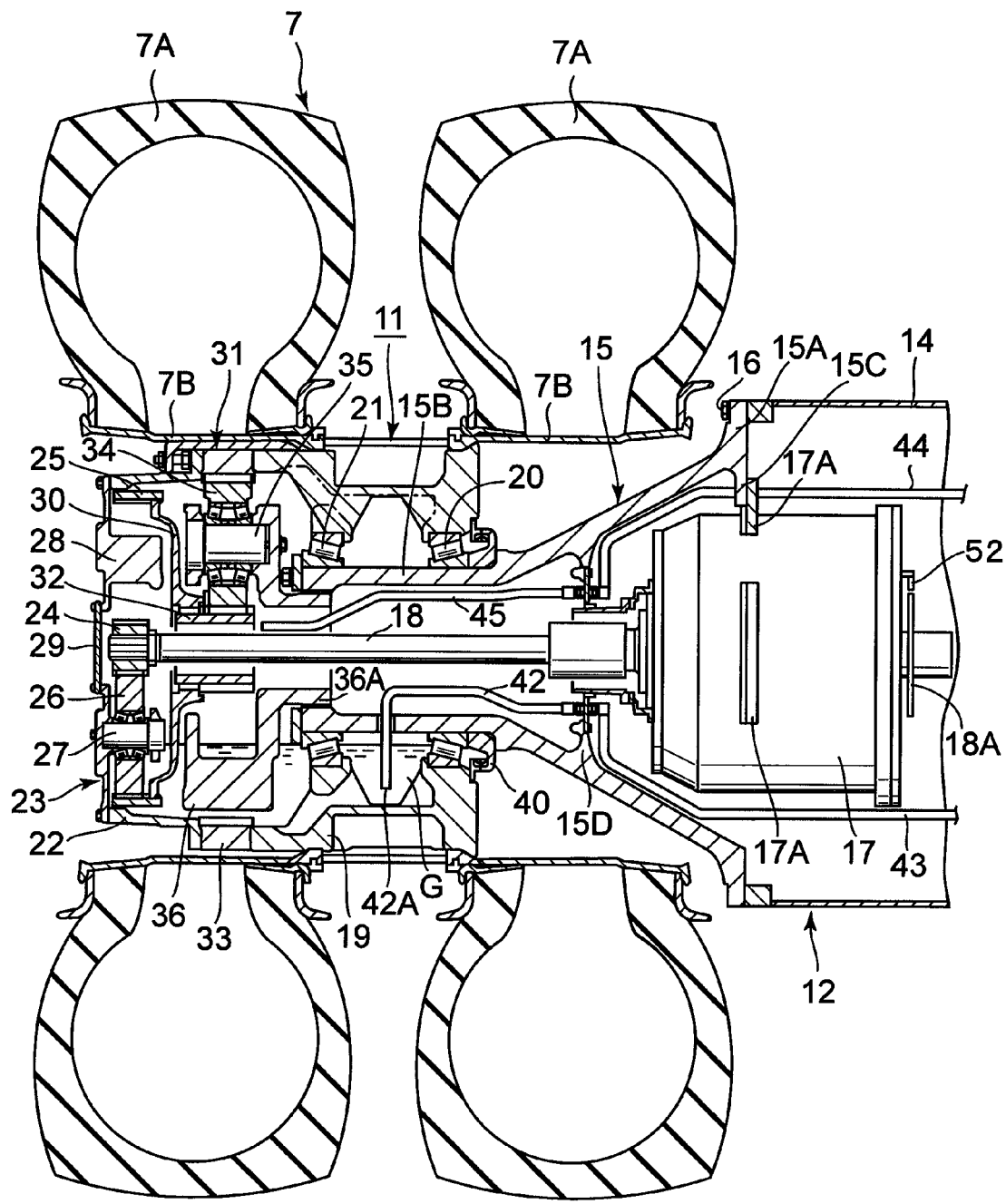
FIG. 3 is an enlarged sectional view taken from the direction of arrows III-III in FIG. 1, showing the travel drive apparatus adopted as a rear wheel drive.
Figure 4:
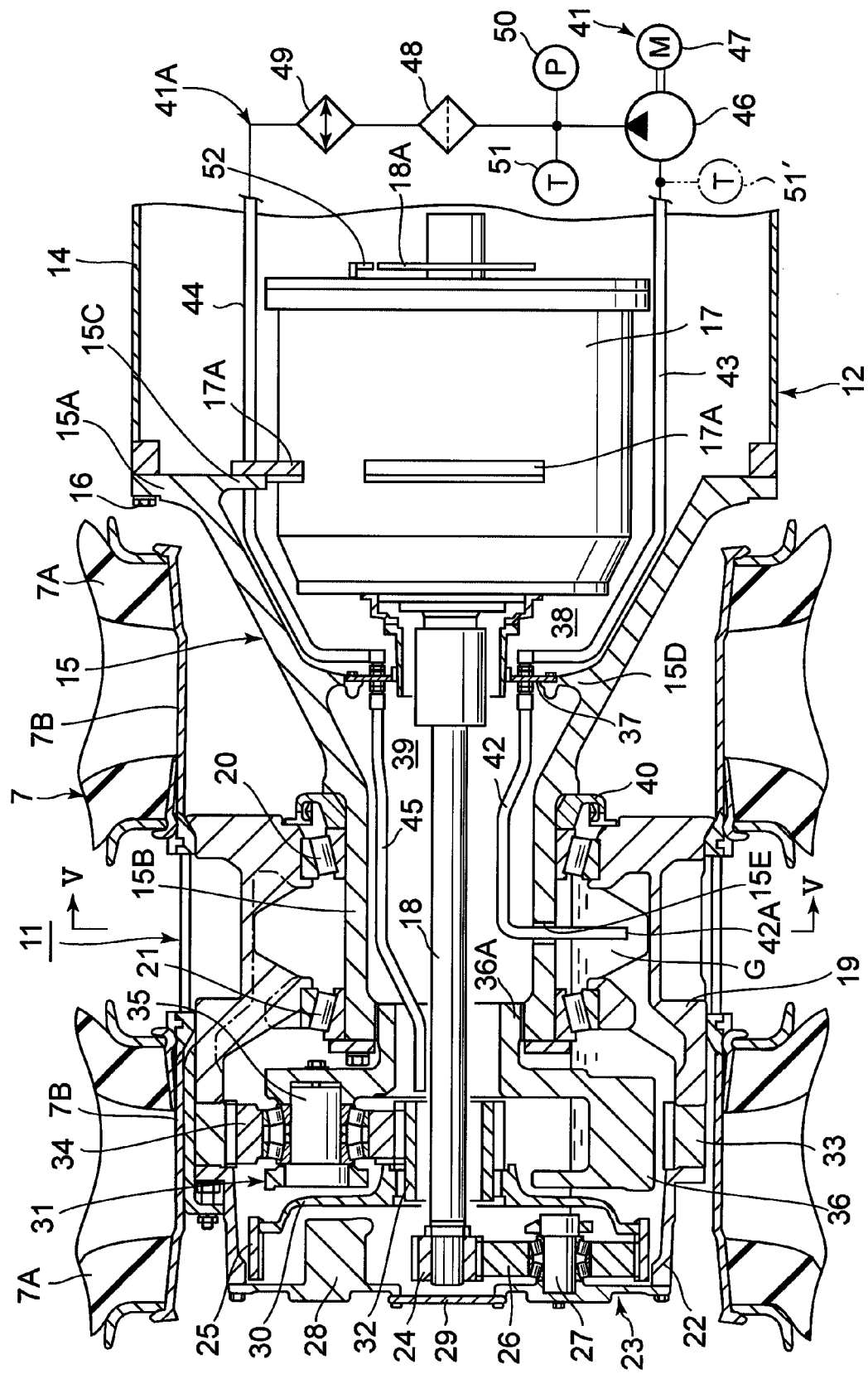
FIG. 4 is a further enlarged sectional view showing a tubular spindle, wheel mounting case, and planetary gear reduction mechanisms in FIG. 3.

In this instance, as shown in FIGS. 3 and 4, the wheel drive motor 17 is provided with a plural number of mounting flanges 17A on its outer peripheral side, the mounting flanges 17A being detachably mounted to amounting seat 15C of the tubular spindle 15 by the use of bolts or the like. Further, each wheel drive motor 17 is provided with a rotational shaft 18 serving as an output shaft which can be driven into rotation in a forward or reverse direction by the wheel drive motor 17.

In this case, the rotational shaft 18 is in the form of an elongated shaft which is extended axially through the small diameter tubular portion 15B of the tubular spindle 15, with its fore end side axially projected out of the tubular spindle 15 as far as a confronting position relative to a lid plate 29, which will be described hereinafter. The rotational shaft 18 is provided with a male spline on the projected distal end to be splined with a sun gear 24 for integral rotation therewith as described in greater detail hereinafter. Further, as shown in FIG. 4, the wheel drive motor 17 is provided with a rotating disk 18A within the motor accommodating tube 14, the rotating disk 18A being put in rotation integrally with the rotational shaft 18 to serve as an indicant in detection of rotational speed by a speed sensor 52, which will be described hereinafter.

Denoted at 19 is a tubular wheel mounting case which is put in rotation together with the rear wheel 7. This wheel mounting case 19 constitutes what is called a wheel hub, and the rims 7B of the rear wheel 7 are detachably mounted on its outer peripheral side, for example, by press-fit means. As shown in FIGS. 3 and 4, the wheel mounting case 19 is rotatably mounted on the outer peripheral side of the tubular spindle 15 (the small diameter tubular portion 15B) through bearings 20 and 21. It should be noted that the lubricant oil G is pooled within the wheel mounting case 19, up to a surface level which is lower than the small diameter tubular portion 15B of the tubular spindle 15.

A ring-shaped internal gear 33 and an outer drum 22 which will be described hereinafter are fixed integrally to an axially outer side of the wheel mounting case 19 by the use of long bolts (not shown). This internal gear 33 is put in rotation together with the wheel mounting case 19. In this instance, rotation of a larger torque caused by reducing the rotation of the wheel drive motor 17 by the below-described planetary gear reduction mechanisms 23 and 31 is transmitted to the wheel mounting case 19 through the ring-shaped internal gear 33. Thus, the wheel mounting case 19 is rotated with a large torque, together with the rear wheel 7 which is a drive wheel of the vehicle.

Indicated at 22 is an outer drum which constitutes a part of the wheel mounting case 19 together with the internal gear 33. As shown in FIG. 4, the outer drum 22 is detachably fixed to the wheel mounting case 19 by the use of a plural number of long bolts (not shown) in such a way as to sandwich the ring-shaped internal gear 33 therebetween at an axially outer side of the wheel mounting case 19.

Indicated at 23 is a first-stage planetary gear reduction mechanism constituting a reduction gear mechanism, which is adopted in the first embodiment of the invention. This planetary gear reduction mechanism 23 is located internally of the outer drum 22. As shown in FIGS. 3 and 4, the first-stage planetary gear reduction mechanism 23 is composed of a sun gear 24 which is splined on a fore end side of the rotational shaft 18, planetary gears 26, for example, three planetary gears 26 (only one of which is shown in the drawing) which are meshed with the sun gear 24 and a ring-shaped internal gear 25, and put in a rotating movement in step with rotation of the sun gear 24, and a carrier 28 which rotatably supports the respective planetary gears 26 through a support pin 27.

The first-stage carrier 28 is detachably fixed in its outer peripheral side to an opening end (to an end surface of an axially outer side) of the outer drum 22 by the use of bolts, and rotates integrally with the outer drum 22 (the wheel mounting case 19). Further, a disk-shaped lid plate 29 is detachably mounted to the inner peripheral side of the carrier 28, and the lid plate 29 is removed from the carrier 28, for example, at the time of inspection of meshing portions between the sun gear 24 and planetary gears 26.

The ring-shaped internal gear 25 is formed as a tubular gear with a short-diameter so as to circumvent the sun gear 24, planetary gears 26, support pins 27 and carrier 28 radially from outside, and located in an inner peripheral side of the outer drum 22 with a narrow radial gap space therebetween. The internal teeth on the inner peripheral side of the ring-shaped internal gear 25 are continually meshed with the respective planetary gears 26. Further, the internal gear 25 is attached to a second-stage sun gear 32 through a coupling 30 which will be described hereinafter.

In this instance, as the sun gear 24 of the first-stage planetary gear reduction mechanism 23 is rotated integrally by the rotational shaft 18 of the wheel drive motor 17, the rotation of the sun gear 24 is converted into rotating and revolving movements of a plural number of planetary gears 26. Further, rotations of the planetary gears 26 (rotations on their own axes) are transmitted to the ring-shaped internal gear 25, putting the latter in rotation at a reduced speed. The rotation of the internal gear 25 is transmitted to the second-stage planetary gear reduction mechanism 31 through a coupling 30.

On the other hand, the revolving movement of each planetary gear 26 is transmitted to the outer drum 22 by way of rotation of the carrier 28. However, since the outer drum 22 is arranged to rotate integrally with the below-described second-stage internal gear 33, the revolution of each planetary gear 26 is suppressed into synchronization with the internal gear 33 (the wheel mounting case 19).

Indicated at 30 is a coupling as a rotation transmitting member which is arranged to rotate integrally with the first-stage internal gear 25. The coupling 30 is in the form of an annular plate which is located in a position between the first-stage planetary gear reduction mechanism 23 and the second-stage planetary gear reduction mechanism 31, and its outer peripheral side is coupled with the first-stage internal gear 25 by means of a spline. On the inner peripheral side, the coupling 30 is coupled with the below-described second-stage sun gear 32 by means of a spline.

Thus, by the coupling 30, rotation of the first-stage internal gear 25 is transmitted to the second-stage sun gear 32 to put the sun gear 32 in rotation integrally with and at the same speed as the ring-shaped internal gear 25. A plural number of oil holes (not shown) are formed in the coupling 30 to circulate the below-described lubricant oil G between inner and outer sides of the coupling 30.

Denoted at 31 is a second-stage planetary gear reduction mechanism constituting a reduction gear mechanism, which is adopted in the first embodiment. This planetary gear reduction mechanism 31 is located between the rotational shaft 18 of the wheel drive motor 17 and the wheel mounting case 19 through the first-stage planetary gear reduction mechanism 23 to transmit the rotation of the rotational shaft 18 to the wheel mounting case 19 at a reduced speed in cooperation with the first-stage planetary gear reduction mechanism 23, thereby producing a large torque in the wheel mounting case 19.

In this case, the second-stage planetary gear reduction mechanism 31 is composed of a tubular sun gear 32 which is mounted coaxially with the rotational shaft 18 and rotates integrally with the coupling 30, planetary gears 34, for example, three planetary gears 34 (only one of which is shown in the drawing) which are meshed with the sun gear 32 and ring-shaped internal gear 33, and put in rotating movement in step with rotation of the sun gear 32, and a carrier 36 which rotatably supports the respective planetary gears 34 through a support pin 35.

The second-stage carrier 36 is integrally formed with a tubular fitting portion 36A on its inner peripheral side, in fitting engagement with the small diameter tubular portion 15B of the tubular spindle 15. This tubular fitting portion 36A is detachably fixed in an inner periphery of the fore end side of the small diameter tubular portion 15B for constituting the tubular spindle 15 in a non-rotatable state through a spline coupling means. The rotational shaft 18 is provided extending in the axial direction in the tubular fitting portion 36A of the carrier 36, along with a fore end side of a below-described supply pipe 45 with a gap therebetween.

On the other hand, the second-stage internal gear 33 is formed as a tubular body with a short diameter, and integrally fixed between the wheel mounting case 19 and the outer drum 22 in such a way as to circumvent the sun gear 32, planetary gears 34, support pins 35 and carrier 36 radially from outside. Further, internal teeth for meshing with the planetary gears 34 are formed on the inner peripheral side of the ring-shaped internal gear 33.

In this instance, since the carrier 36 of the second-stage planetary gear reduction mechanism 31, which constitutes the final stage, is fixed to the tubular spindle 15, revolving movements of the planetary gears 34 (rotation of the carrier 36) is restrained. Therefore, as the sun gear 32 of the second-stage planetary gear reduction mechanism 31 is put in rotation integrally with the coupling 30, the rotation of the sun gear 32 is converted into rotations of a plural number of the planetary gears 34, and this rotation is outputted from the ring-shaped internal gear 33 as a reduced-speed rotation. As a consequence, by the two-stage speed reduction through the first- and second-stage planetary gear reduction mechanisms 23 and 31, reduced speed and a high output, i.e., rotation of a low speed and a large rotational torque is transmitted to the wheel mounting case 19 on the side of the rear wheel 7.

On the other hand, denoted at 37 is a partition wall which is provided internally of the tubular spindle 15 in the vicinity of the wheel drive motor 17. This partition wall 37 is in the form of an annular partition plate which is fixed to a mounting portion 15D of the tubular spindle 15 by bolts in its outer peripheral side. In this instance, by the partition wall 37, the inner space of the tubular spindle 15 is partitioned into a motor room 38 on one axial side (on the inner side) of the partition wall 37, and a tubular space 39 on the other axial side (on the outer side). The tubular space 39 is constantly held in communication with the inside of the wheel mounting case 19 through the tubular fitting portion 36A of the carrier 36 and inner peripheral side of the sun gear 32.

Indicated at 40 is a seal device which is provided in the vicinity of the bearing 20. This seal device 40 maintains a liquid tight seal between the tubular spindle 15 and the wheel mounting case 19, as shown in FIG. 4, and is constituted by what is called a floating seal. Further, the seal device 40 is adapted to prevent leaks of the lubricant oil G which is pooled between the tubular spindle 15 and the wheel mounting case 19, while preventing intrusion of sand, soil and rainwater.

Now, given below is a description on the construction of a lubricant oil circulation means 41 (hereinafter referred to simply as "lubricant oil circulation device 41") which is a principal portion in accordance with the first embodiment.

The lubricant oil circulation device 41 serves to forcibly circulate the lubricant oil G to and from inner and outer sides of the wheel mounting case 19, cooling down the lubricant oil G in circulation at an oil cooler 49, which will be described hereinafter. The lubricant oil circulation device 41 is composed of suction pipes 42 and 43, supply pipes 44 and 45, lubricant pump 46, pump drive motor 47, filter 48, oil cooler 49 and vehicle controller 53 (see FIG. 6) serving as a control means, as described in greater detail hereinafter.

Here, the lubricant oil circulation device 41 has left and right circulation lines 41A (only the left one is shown in FIG. 4) which are independent between left and right in correspondence with the left and right motor accommodating tubes 14 and tubular spindles 15 illustrated in FIG. 2. Each of these circulation lines 41A is constituted by the suction pipes 42 and 43, the supply pipes 44 and 45, and the like, which will be described hereinafter. These circulation lines 41A are each provided independently for the left and right wheel mounting cases 19 to circulate the lubricant oil G independently, which is pooled in each one of the left and right wheel mounting cases 19, along the left and right circulation lines 41A by lubricant pumps 46, which will be described hereinafter.

Figure 5:
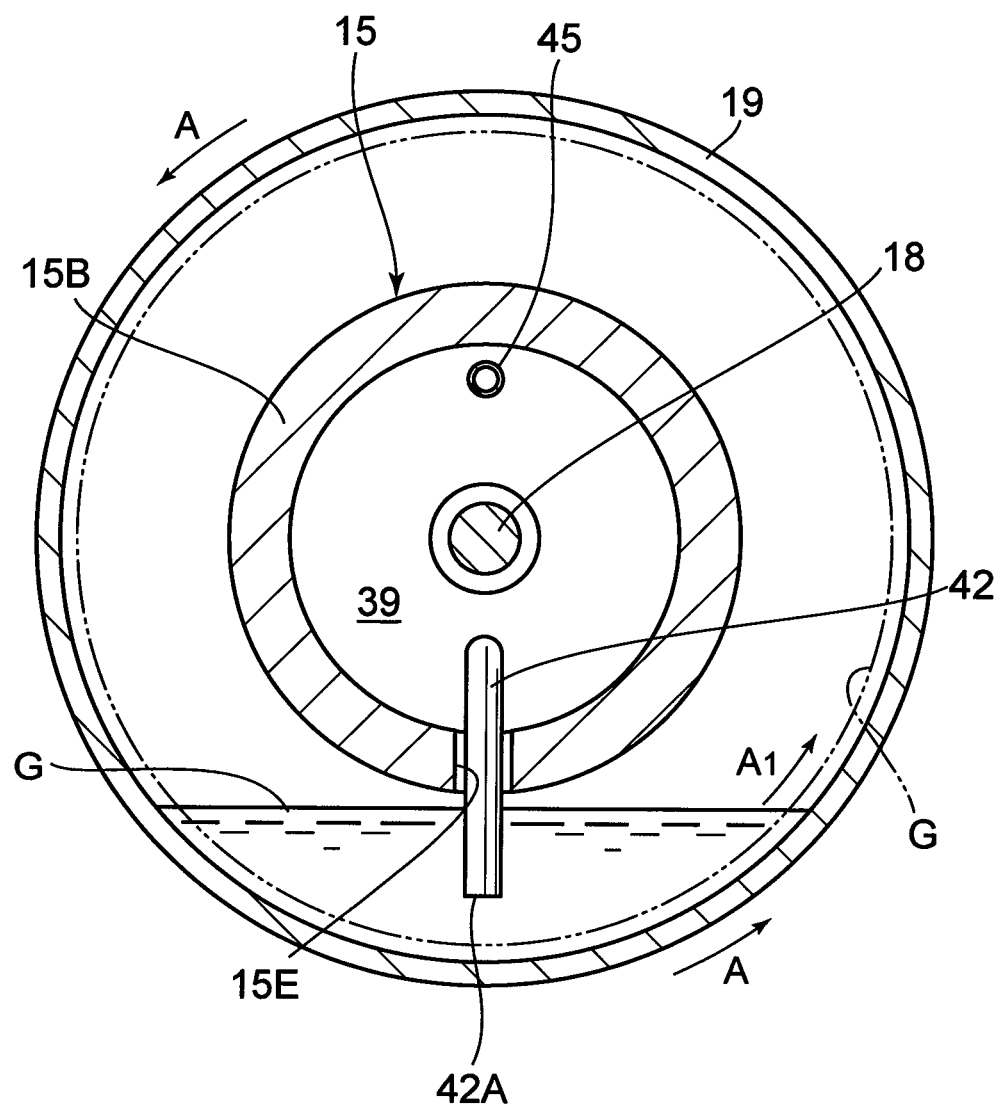

Indicated at 42 is a suction pipe which constitutes a suction side of each one of the circulation lines 41A. As shown in FIGS. 4 and 5, a fore end side of this suction pipe 42 is extended radially outward (downward) from the small diameter tubular portion 15B of the tubular spindle 15 through the radial hole 15E of the tubular spindle 15. Further, the bottom end (fore end) of the suction pipe 42 serves as a suction port 42A immersed in the lubricant oil G which is pooled in a lower position of the wheel mounting case 19. Upon driving a below-described lubricant pump 46, the lubricant oil G is sucked into the suction pipe 42 through the suction port 42A.

Indicated at 43 is another suction pipe which is located on the side of the motor room 38 of the tubular spindle 15. As shown in FIG. 4, this suction pipe 43 is connected to the base end side of the suction pipe 42 at a position of the partition wall 37, and extended through the motor accommodating tube 14 toward a lubricant pump 46, which will be described hereinafter. Both of these suction pipes 42 and 43 are connected to a suction side of the lubricant pump 46.

Denoted at 44 and 45 are supply pipes which constitute an output side of the circulation lines 41A. These supply pipes 44 and 45 are connected to the output side of the lubricant pump 46 to supply the lubricant oil G to planetary gear reduction mechanisms 23 and 31 in the wheel mounting case 19. In this instance, the supply pipe 44 is disposed on the motor room 38 side of the tubular spindle 15, and its base end side is connected to the output side of the lubricant pump 46. Meanwhile, the base end side of the supply pipe 45 is connected to the fore end side of the supply pipe 44 at the position of the partition wall 37. A fore end side of the supply pipe 45 is extended axially through a tubular space 39 of the tubular spindle 15 and is disposed at a position higher than the rotational shaft 18.

Designated at 46 are lubricant pumps which are each rotationally driven by a pump drive motor 47 serving as an electric motor. The lubricant pumps 46 are respectively provided in the left and right circulation lines 41A as shown in FIG. 4.

As the lubricant pump 46 is rotated by being driven by the pump drive motor 47, the lubricant oil G which is sucked in through the suction pipes 42 and 43 is sent forward to the supply pipes 44 and 45 through a filter 48 and an oil cooler 49, which will be described hereinafter.

Denoted at 49 are oil coolers which are provided as heat exchangers in the course of the supply pipes 44, and the oil coolers 49 are disposed in the left and right circulation lines 41A, respectively. These oil coolers 49 serve to cool down the lubricant oil G which is in circulation through the circulation lines 41A, sending the lubricant oil G of approximately room temperature toward the supply pipes 45, for example.

Now, given below is a description on various sensors and vehicle controller (control means) which are adopted in this embodiment.

In the first place, indicated at 50 are pressure sensors which serve to detect output pressure of the lubricant pump 46. As shown in FIG. 4, the pressure sensors 50 are disposed in the course of the supply pipe 44 by being located between the output side of the lubricant pump 46 and the filter 48. Besides, the pressure sensor 50 detects the output pressure of the lubricant pump 46 and outputs its detection signal to the vehicle controller 53, as described hereinafter.

Denoted at 51 is a temperature sensor for detecting the temperature of the lubricant oil G. As shown in FIG. 4, this temperature sensor 51 is disposed such as in the course of the supply pipe 44 by being located between the output side of the lubricant pump 46 and the filter 48. The temperature sensor 51 detects the temperature of the lubricant oil G before it is cooled by the oil cooler 49, as shown in FIG. 4, and outputs its detection signal to the below-described vehicle controller 53.

Here, the present inventors made a comparison between the temperature of the lubricant oil G pooled in the wheel mounting case 19 and the temperature of the lubricant oil G detected by the temperature sensor 51 on the output side of the lubricant pump 46. It was then confirmed that, during the drive of the lubricant pump 46, there is not substantial difference between the two temperatures since the lubricant oil G continues to circulate from the suction pipes 42 and 43 toward the supply pipe 44.

However, when the lubricant pump 46 is stopped, since the lubricant oil G cannot flow from the suction pipes 42 and 43 toward the supply pipe 44, the temperature of the lubricant oil G cannot be detected by the temperature sensor 51 provided on the output side of the lubricant pump 46. For this reason, the configuration provided is such that the temperature T (detection signal) of the lubricant oil G detected by the temperature sensor 51 is outputted to the vehicle controller 53 (see FIG. 6) only during the drive of the lubricant pump 46, and the temperature (latest data during driving) detected by the temperature sensor 51 immediately before the stop of the lubricant pump 46 is used as a substitute for the temperature detection signal (temperature T of the lubricant oil G) at the time when the lubricant pump 46 is stopped.

Indicated at 52 is a speed sensor which is adapted to detect the output rotation of the wheel drive motor 17. As shown in FIG. 4, this speed sensor 52 is located in the vicinity of a rotating disk 18A on the rotational shaft 18 to detect rotational speed of the rotating disk 18A as a rotational speed of the rear wheel 7 (as a travel speed). Namely, since the rotation at a speed reduction ratio (for example, a speed reduction ratio of 30 to 40), which is predetermined by the multi-stage planetary gear reduction mechanisms 23 and 31 with respect to the rotational speed of the wheel drive motor 17 (rotational shaft 18), has been transmitted to the rear wheel 7 (wheel mounting case 19), the rotational speed of the rear wheel 7 (travel speed of the vehicle) can be determined by detecting the rotational speed of the rotating disk 18A.

Figure 6:
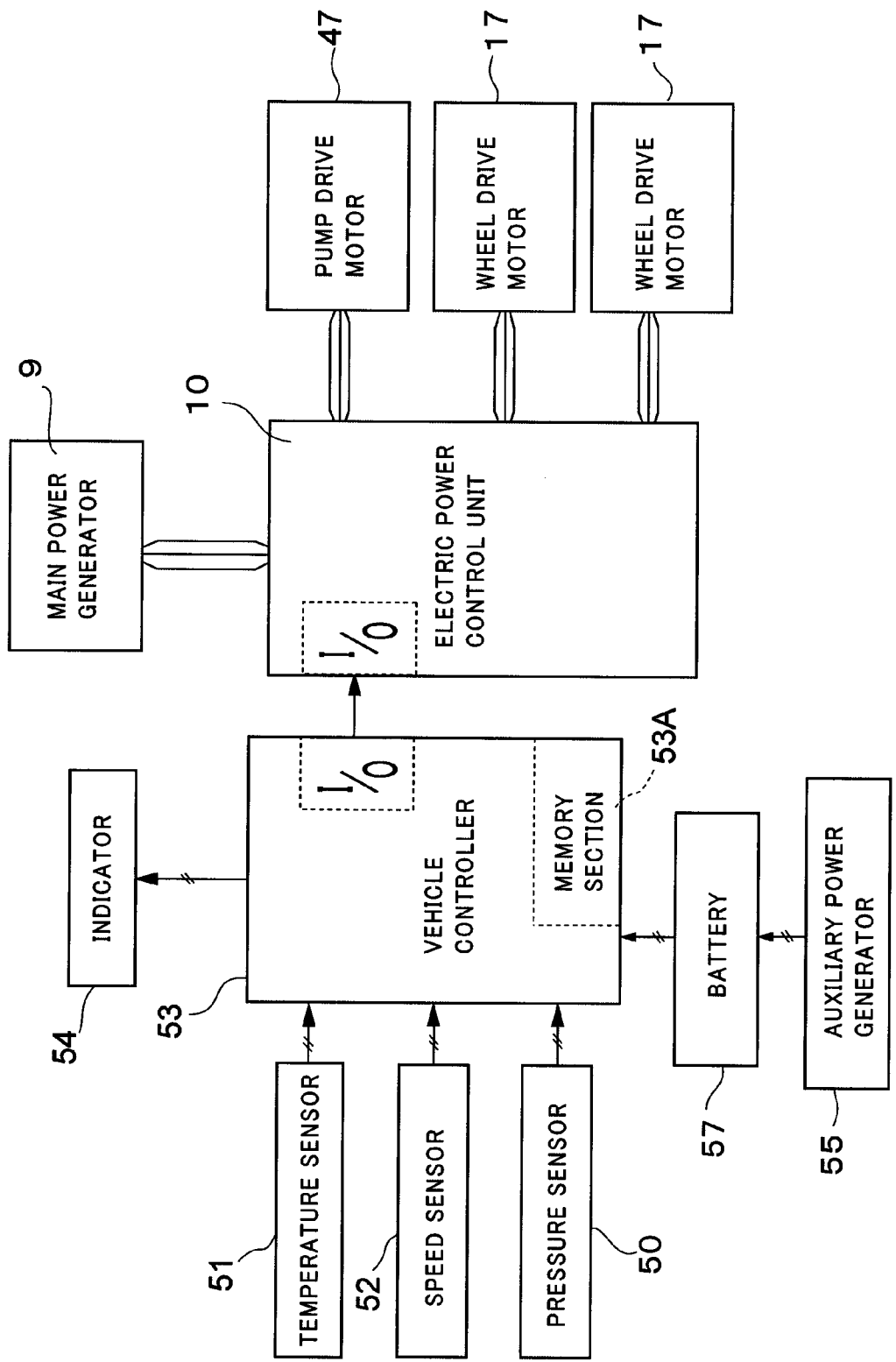

Indicated at 53 is a vehicle controller which serves as a control means and is constituted by a microcomputer and the like. As for this vehicle controller 53, as shown in FIG. 6, its input side is connected to the pressure sensor 50, the temperature sensor 51, the speed sensor 52, and the like while its output side is connected to an indicator 54 and the like and it is further connected to the left and right wheel drive motors 17, the pump drive motor 47, and the like through the electric power control unit 10.

In this case, the indicator 54 constitutes a notifying means for notifying such as "overheat", "excess speed", or "sensor abnormality". The indicator 54 is disposed in the cabin 5 of the dump truck 1 shown in FIG. 1, and displays a warning and information such as "overheat" to the operator, as described below. In consequence, by using the indicator 54, it is possible to warn that the temperature state of the lubricant oil or the traveling state is not normal.

Figure 7:
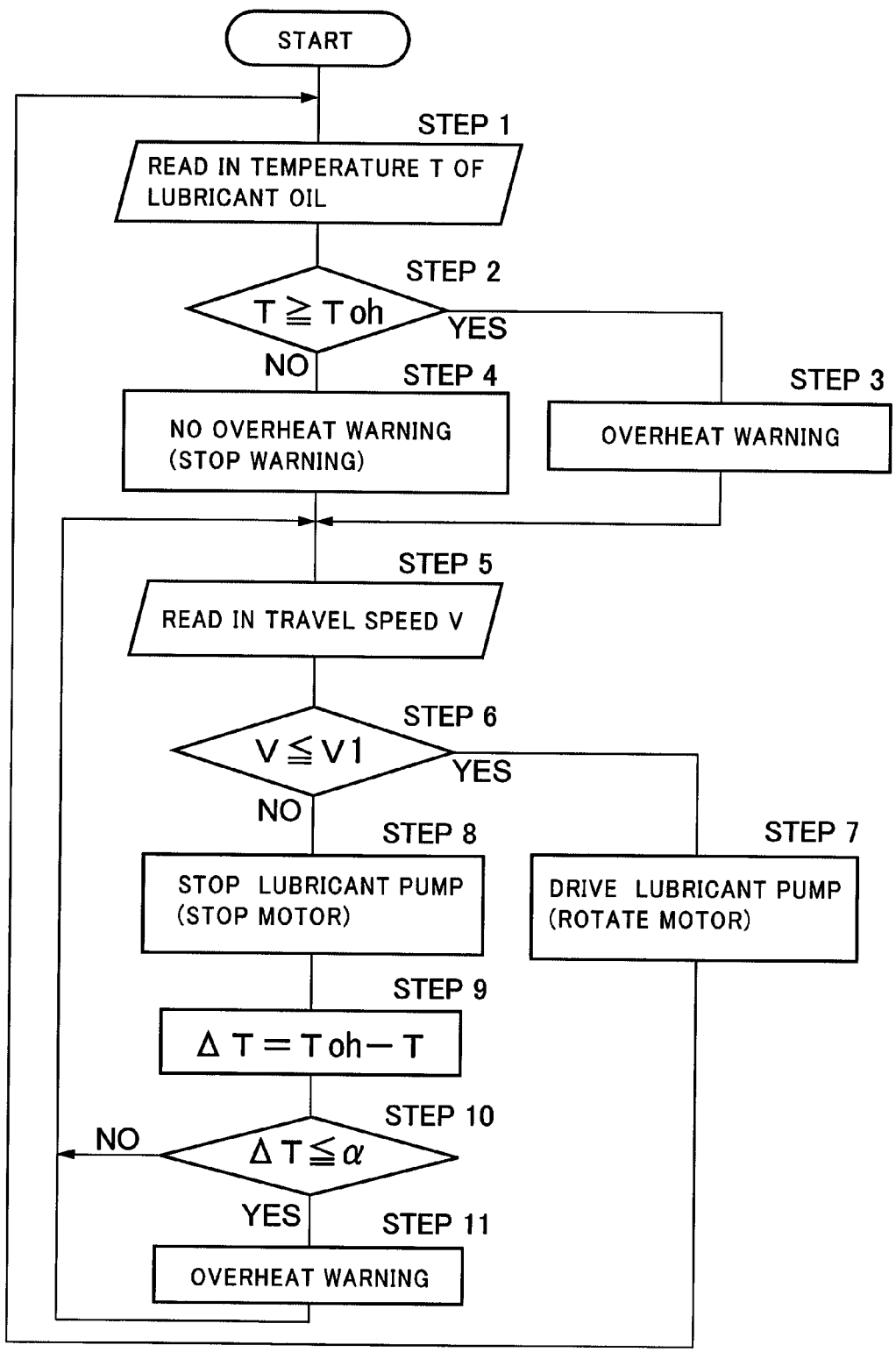
FIG. 7 is a flow chart of a supply control of the lubricant oil, overheat warning processing, and the like according to the first embodiment.

The vehicle controller 53 has a memory section 53A consisting of a ROM, a RAM (including a nonvolatile memory), and the like. Stored in this memory section 53A are a warning temperature Toh (for example, Toh=90 to 95° C.) and a determination speed V1 (for example, V1=25 to 35 km/h), which are shown in FIG. 7, and also stored therein is, among others, a program for supply control processing of the lubricant oil to carry out such as the drive and stop of the pump drive motor 47.

Indicated at 55 is an auxiliary power generator which is mounted on the vehicle body 2 separately from the main power generator 9. As shown in FIG. 2, this auxiliary power generator 55 is driven by the engine 8 through a belt drive mechanism 56 to generate electric power, for example, a direct current of 24V (volt). The electric power generated by the auxiliary power generator 55 is used for charging a battery 57, which constitutes a power supply source for the vehicle controller 53.

Denoted at 58 is a hoist cylinder which is operative for lifting up and down the vessel 3 of the dump truck 1 of FIG. 1. The hoist cylinders 58 are respectively disposed on both left and right sides of the vehicle body 2 in such a manner as to be positioned between the front wheels 6 and the rear wheels 7, as shown in FIG. 1. Further, pressure oil is fed to and from each hoist cylinder 58 from the outside to vertically expand and contract same, lifting (tilting) the vessel 3 up and down about the pin coupling portion 4 of the rear side.

Indicated at 59 is an operating oil tank which is attached to a side surface of the vehicle body 2 by being positioned below the vessel 3 as shown in FIG. 1. Operating oil in the operating oil tank 59 is pressurized by the above-mentioned hydraulic pump and fed as pressure oil to and from the hoist cylinders 58 and a steering cylinder of a power steering system, and the like.

The dump truck 1 of this embodiment has the above-described construction, and its operation will be described in the manner as follows.

In the first place, the engine 8 of FIG. 2 is started by an operator who has got into the cabin 5 of the dump truck 1. Whereupon, a main hydraulic pump (not shown), which is a main hydraulic pressure source, is rotationally driven by the engine 8, and at the same time the main and auxiliary power generators 9 and 55 are put in operation to generate electric power. The electric power generated by the auxiliary power generator 55 is charged in the battery 57, while the electric power generated by the main power generator 9 is supplied to the left and right wheel drive motors 17 and the pump drive motor 47 and the like through the electric power control unit 10.

When the vehicle is driven for traveling, a vehicle drive current is supplied to each one of the wheel drive motors 17 of the rear wheels 7 side from the electric power control unit 10. At this time, the vehicle controller 53 individually feedback controls the rotational speeds of the left and right wheel drive motors 17 by the electric power control unit 10. Thus, the left and right rear wheels 7 are rotationally driven separately and independently of each other as the drive wheels of the vehicle, and driven at the same speed when the vehicle is in travel in a straightforward direction.

Namely, by the travel drive apparatus 11 which is provided on the rear wheel 7 side of the dump track 1, the rotation of the wheel drive motor 17 (the rotational shaft 18) is reduced in speed through the multi-stage planetary gear reduction mechanisms 23 and 31, for example, at a reduction ratio of from 30 to 40, to drive the drive wheels (the rear wheel 7) of the vehicle to travel with a large rotational torque together with the wheel mounting case 19. In this way, the left and right rear wheels 7 are driven respectively by the left and right wheel drive motors 17 independently of each other at controlled rotational speeds.

Further, as shown in FIGS. 3 to 5, the lubricant oil G is pooled in the wheel mounting case 19, up to a surface level which is lower than the small diameter tubular portion 15B of the tubular spindle 15. That is to say, by lowering the surface level of the lubricant oil in the wheel mounting case 19, the stirring resistance (viscous resistance) of the lubricant oil G resulting from the rotation of the ring-shaped internal gear 25, planetary gears 26 and 34, coupling 30 and the like can be suppressed to as small a value as possible.

In this instance, as the first- and second-stage planetary gear reduction mechanisms 23 and 31 are put in operation by the rotational shaft 18 of the wheel drive motor 17, the lubricant oil G in the wheel mounting case 19 is incessantly raked upward by the first- and second-stage internal gears 25 and 33 to effect rake-up lubrication and the like with respect to the planetary gear reduction mechanisms 23 and 31.

Then, as soon as the lubricant pump 46 is driven by the pump drive motor 47 of FIG. 4, the lubricant oil G in the wheel mounting case 19 is sucked into the lubricant pump 46 through the suction port 42A of the suction pipe 42, and delivered toward the supply pipes 44 and 45. At this time, the lubricant oil G is supplied from the fore end side of the supply pipe 45 to the sun gears 24 and 32, the planetary gears 26 and 34 and the like of the planetary gear reduction mechanisms 23 and 31 in a state in which the lubricant oil G is cooled down by the oil cooler 49 to keep the respective gears in a lubricated state.

Further, the lubricant oil G which has been supplied to the first- and second-stage planetary gear reduction mechanisms 23 and 31 in the wheel mounting case 19 is caused to gradually drip down by gravity while lubricating tooth faces and the like of the respective gears, and is pooled again at the lower position of the wheel mounting case 19. Then, the lubricant oil G pooled at the lower position of the wheel mounting case 19 is sucked again into the lubricant pump 46 through the suction port 42A of the suction pipe 42 and delivered to the supply pipes 44 and 45 side.

Incidentally, when the dump truck 1 (vehicle) is traveling, the wheel mounting case 19 rotates together with the rear wheel 7 at a fast speed in the direction of arrow A in FIG. 5. For this reason, the lubricant oil G pooled in the wheel mounting case 19 is raked up in the direction of arrow A1 along the inner peripheral surface of the wheel mounting case 19 and is stuck thereto. Then, when the travel speed of the dump truck 1 is increased, the lubricant oil G is subjected to the influence of the centrifugal force accompanying the high speed rotation inside the wheel mounting case 19 which rotates at high speed together with the rear wheel 7.

As a consequence, as indicated by a two-dot chain line in FIG. 5, the lubricant oil Gin the wheel mounting case 19 behaves in such a way as to stick on the entire inner wall surfaces of the wheel mounting case 19, causing the surface level of the lubricant oil G to drop below the suction port 42A of the suction pipe 42. Thus, when the travel speed is increased, the suction port 42A of the suction pipe 42 disposed in the wheel mounting case 19 becomes located away from the surface level of the lubricant oil G, disabling the suction action of the lubricant oil G by the lubricant pump 46. Besides, in such a case, the lubricant pump 46 is put in a dry idling operation which would cause the seals, bearings, and the like of the lubricant pump 46 are likely to become worn and damaged at an early period, causing the pump life to become shortened.

Accordingly, in order to prevent the lubricant pump 46 from assuming the idling state, the present inventors studied the feasibility of immediately stopping the drive of the lubricant pump 46 when the travel speed V of the vehicle has become faster than a predetermined determination speed V1 (for example, V1=25 to 35 km/h). However, if the operator of the dump truck 1 continues the high-speed travel of the vehicle even after the lubricant pump 46 is thus stopped, the temperature of the lubricant oil G rises, so that overheating can undesirably result in some cases.

Particularly, in the case of the travel drive apparatus 11 used in the dump truck 1, the configuration provided is such that the planetary gear reduction mechanisms 23 and 31 are provided in the wheel mounting case 19, and the lubricant oil G is pooled in its interior. For this reason, there is a problem in that it is, in practice, difficult to provide a temperature sensor inside the wheel mounting case 19 to directly detect the temperature of the lubricant oil, since structural restrictions are large.

Therefore, the present inventors studied the feasibility of providing the temperature sensor 51 on the output side of the lubricant pump 46, as illustrated in FIG. 4, by being located outside the wheel mounting case 19. In this case, however, when the drive of the lubricant pump 46 is stopped, the temperature of the lubricant oil G pooled in the wheel mounting case 19 cannot be detected by the temperature sensor 51. Further, if the travel of the vehicle is continued even after stopping the lubricant pump 46, there is a possibility that the temperature of the lubricant oil G undesirably rises further.

Accordingly, in the first embodiment, the configuration provided is such that processing for controlling the drive and stop of the lubricant pump 46 in accordance with the travel speed of the vehicle and processing of warning "overheat" when the drive of the lubricant pump 46 is stopped are executed in accordance with the processing program shown in FIG. 7.

It should be noted that the processing program of the "overheat" warning shown in FIG. 7 is premised on the case in which this processing program is executed in the course of the so-called "cooling operation" when the lubricant oil G is being forcibly circulated by the drive of the lubricant pump 46, and the lubricant oil G cooled by the oil cooler 49 is being supplied to the planetary gear reduction mechanisms 23 and 31.

In FIG. 7, when the processing operation is started in the course of such "cooling operation", in Step 1 in FIG. 7, the temperature of the interior of the wheel mounting case 19 is read from the temperature sensor 51 as the temperature T of the lubricant oil G. In a next Step 2, a determination is made as to whether or not the temperature T detected by the temperature sensor 51 has risen until it has reached the warning temperature Toh (for example, Toh=90 to 95° C.).

In this instance, the warning temperature Toh is a temperature in a state in which the lubricant oil G in the wheel mounting case 19 has assumed an excessively high temperature, and means a temperature at which, for instance, the internal planetary gear reduction mechanisms 23 and 31 should be warned so as not to undergo overheating.

Then, when "YES" is given in the determination in Step 2, the temperature T of the lubricant oil G has reached the warning temperature Toh or higher, so that the operation proceeds to Step 3 to carry out processing for issuing an "overheat" warning. In this case, the temperature T of the lubricant oil G has reached the warning temperature Toh or higher despite the fact that the forced circulation of the lubricant oil G is being effected by driving the lubricant pump 46.

Accordingly, in such a case, the operator is notified by the indicator 54 shown in FIG. 6 that the engine 8 should be stopped by bringing the vehicle to a standstill at an early period, and the operation proceeds to a next Step 5. It should be noted that it is normally unlikely that the temperature T of the lubricant oil G has reached the warning temperature Toh or higher when the forced circulation of the lubricant oil G is being effected by the lubricant pump 46. Thus, the case where "YES" is given in the determination in Step 2 is a case where there is a need to conduct the maintenance and inspection operation of the apparatus.

On the other hand, when "NO" is given in the determination in Step 2, the temperature T of the lubricant oil G is lower than the warning temperature Toh, so that the operation proceeds to a next Step 4 in which the "overheat" warning is not issued, and the operation proceeds to a next Step 5. It should be noted that, in the program cycle after the "overheat" warning has been issued in Step 3, the operation proceeds to Step 5 after stopping that warning based on Step 3.

In the processing of Step 5, the travel speed V of the vehicle is read from the speed sensor 52. Then, in a next Step 6, a determination is made as to whether or not the travel speed V is equal to or less than a predetermined determination speed V1 (for example, V1=25 to 35 km/h). In this instance, determination speed V1 is a reference value for determining whether or not the travel speed V of the vehicle has become fast, and the lubricant oil G in the wheel mounting case 19 sticks to its inner wall surface, so that the suction of the lubricant oil G from the suction port 42A of the suction pipe 42 fails to be effected, causing the lubricant pump 46 to idle.

Then, when "YES" is given in the determination in Step 6, the travel speed V is equal to or less than the determination speed V1, so that the operation proceeds to a next Step 7 to continue the rotation of the pump drive motor 47 so as to continue the drive of the lubricant pump 46. In consequence, the forced circulation of the lubricant oil G is continued, and the processing in and after Step 1 is repeated.

Namely, in this case, the lubricant oil G pooled at the lower position in the wheel mounting case 19 is delivered to the supply pipes 44 and 45 side while being sucked from the suction ports 42A of the suction pipe 42 by the lubricant pump 46. Then, the lubricant oil G, while being circulated through the supply pipes 44 and 45, is cooled by the oil cooler 49. Thus, the lubricant oil G in a state of relatively low temperature is supplied from the fore end side of the supply pipe 45 to the sun gears 24 and 32, the planetary gears 26 and 34, and the like of the planetary gear reduction mechanisms 23 and 31, thereby making it possible to hold the respective gears in the lubricated state.

On the other hand, when "NO" is given in the determination in Step 6, it is the case where the travel speed V has become fast and has exceeded the determination speed V1. In this case, the rear wheel 7 rotates at high speed together with the wheel mounting case 19, and the lubricant oil G in the wheel mounting case 19 is subjected to the action of the centrifugal force accompanying the high speed rotation. For this reason, the lubricant oil G in the wheel mounting case 19 behaves in such a manner as to stick to the entire periphery of the inner wall surface of the wheel mounting case 19, as shown by the two-dot chain line in FIG. 5. Therefore, it can be determined that the surface level of the lubricant oil G has dropped to a position lower than the suction port 42A of the suction pipe 42. Namely, since the travel speed V of the vehicle is fast, there is a possibility that the suction port 42A of the suction pipe 42 disposed in the wheel mounting case 19 becomes located away from the surface level of the lubricant oil G, causing the lubricant pump 46 to be driven in the idling state.

Accordingly, in such a case, the operation proceeds to Step 8 to stop the pump drive motor 47 and interrupt the drive of the lubricant pump 46. It is hence possible to prevent the lubricant pump 46 from being driven in the idling state, thereby making it possible to overcome the problem that the seals, bearings, and the like of the lubricant pump 46 become worn and damaged at an early period due to the dry operation.

Next, in Step 9, a temperature difference $\Delta T$ between the temperature T of the lubricant oil G detected by the processing in Step 1 before stopping the lubricant pump 46 and the aforementioned warning temperature Toh is determined by Formula 1 below. Then, in a next Step 10, a determination is made as to whether or not this temperature difference $\Delta T$ is within the range of a predetermined threshold value $\alpha$ (for example, 5° C.), as shown in Formula 2 below, namely, whether or not it is a value equal to or lower than the threshold value $\alpha$.

$$\Delta T = Toh - T \quad \text{(Formula 1)}$$

$$\Delta T \leq \alpha \quad \text{(Formula 2)}$$

Then, while "NO" is being given in the determination in Step 10, the temperature difference $\Delta T$ is greater than the predetermined threshold value $\alpha$, and it can be determined that the temperature T of the lubricant oil G is sufficiently lower than the warning temperature Toh. Accordingly, in this case, the operation returns to Step 5 to continue the processing that follows.

On the other hand, when "YES" is given in the determination in Step 10, the temperature difference $\Delta T$ is within the predetermined threshold value $\alpha$, and it can be determined that the temperature state of the lubricant oil G or the traveling state is not normal as the temperature T of the lubricant oil G is approaching the warning temperature Toh. Accordingly, in this case, the operation proceeds to Step 11 to issue the "overheat" warning. Namely, the operator is notified by, for example, the indicator 54 shown in FIG. 6 that the travel speed V of the vehicle should be lowered to a speed which is equal to or less than the aforementioned determination speed V1. Subsequently, the operation returns to Step 5 to continue the processing that follows.

Further, while the processing in and after Step 5 is repeated, when the operator, upon hearing the "overheat" warning, dropped the travel speed V of the vehicle to a speed which is equal to or less than the aforementioned determination speed V1, "YES" is given in the determination in Step 6. For this reason, in the next Step 7, the drive of the lubricant pump 46 is resumed, whereby it is possible to forcibly circulate the lubricant oil G pooled in the wheel mounting case 19 by the lubricant pump 46.

Thus, in this embodiment, when the drive of the lubricant pump 46 is stopped by the pump drive motor 47 to prevent the lubricant pump 46 from assuming the idling state and the dry operation from continuing, a determination is made as to whether or not the temperature difference $\Delta T$ between the temperature T of the lubricant oil G detected earlier by the temperature sensor 51 and the warning temperature Toh is equal to or lower than the predetermined threshold value $\alpha$ (for example, 5° C. or thereabouts). The configuration provided is such that when this temperature difference $\Delta T$ is within the range of the threshold value $\alpha$, the "overheat" warning is issued to the operator of the dump truck 1.

In consequence, even in the case where the temperature sensor 51 is provided on the output side of the lubricant pump 46 by being located on the outer side of the wheel mounting case 19, as shown in FIG. 4, the planetary gear reduction mechanisms 23 and 31 and the like inside the wheel mounting case 19 can be prevented from overheating by the warning to the operator.

Namely, in this embodiment, the configuration provided is such that since it is, in practice, difficult to provide the temperature sensor within the wheel mounting case 19 to directly detect the temperature of the lubricant oil because structural restrictions are large, the temperature sensor 51 is provided on the output side of the lubricant pump 46. When the drive of the lubricant pump 46 is stopped, the latest data detected by the temperature sensor 51 (temperature T detected at the time of the drive of the lubricant pump 46) is used as a substitute for the temperature of the lubricant oil G pooled in the wheel mounting case 19.

As a result, even in cases where the travel of the vehicle is continued after stopping the lubricant pump 46, by using the temperature T detected in advance during the drive of the lubricant pump 46 (latest data of the temperature T), as described above, it is possible to issue the "overheat" warning to the operator of the dump truck 1, thereby making it possible to prevent the temperature of the lubricant oil G from rising further than the warning temperature Toh.

Then, when the operator of the dump truck 1 has lowered the travel speed V to a speed which is equal to or less than the determination speed V1 in accordance with the "overheat" warning, the lubricant pump 46 can be operated again by redriving the pump drive motor 47. In consequence, the lubricant oil G pooled in the wheel mounting case 19 can be forcibly circulated again by the lubricant pump 46. As a result, it is possible to lower the temperature of the lubricant oil G by using the oil cooler 49, so that the lubrication performance and cooling performance can be enhanced by supplying low-temperature lubricant oil to the planetary gear reduction mechanisms 23 and 31 in the wheel mounting case 19.

Therefore, according to this embodiment, the temperature difference $\Delta T$ between the temperature T of the lubricant oil G detected by the temperature sensor 51 before stopping the lubricant pump 46 and the warning temperature Toh is determined, and when this temperature difference $\Delta T$ is within the range of the predetermined threshold value $\alpha$, the overheating of the vehicle can be prevented by issuing a warning, thereby making it possible to enhance the reliability and service life of the apparatus.

Figure 8:
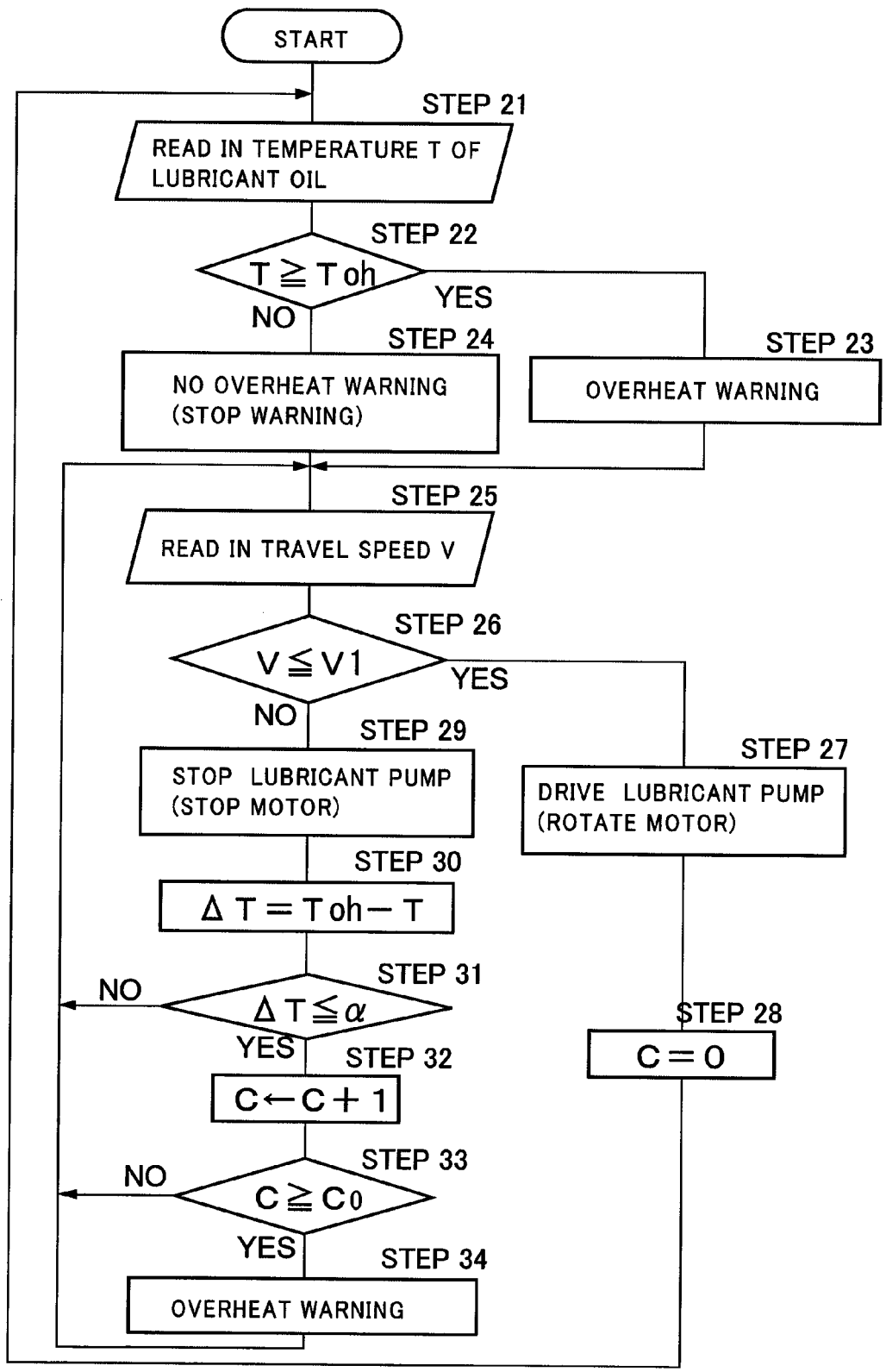
FIG. 8 is a flow chart of the supply control of the lubricant oil, overheat warning processing, and the like according to a second embodiment.
Figure 9:
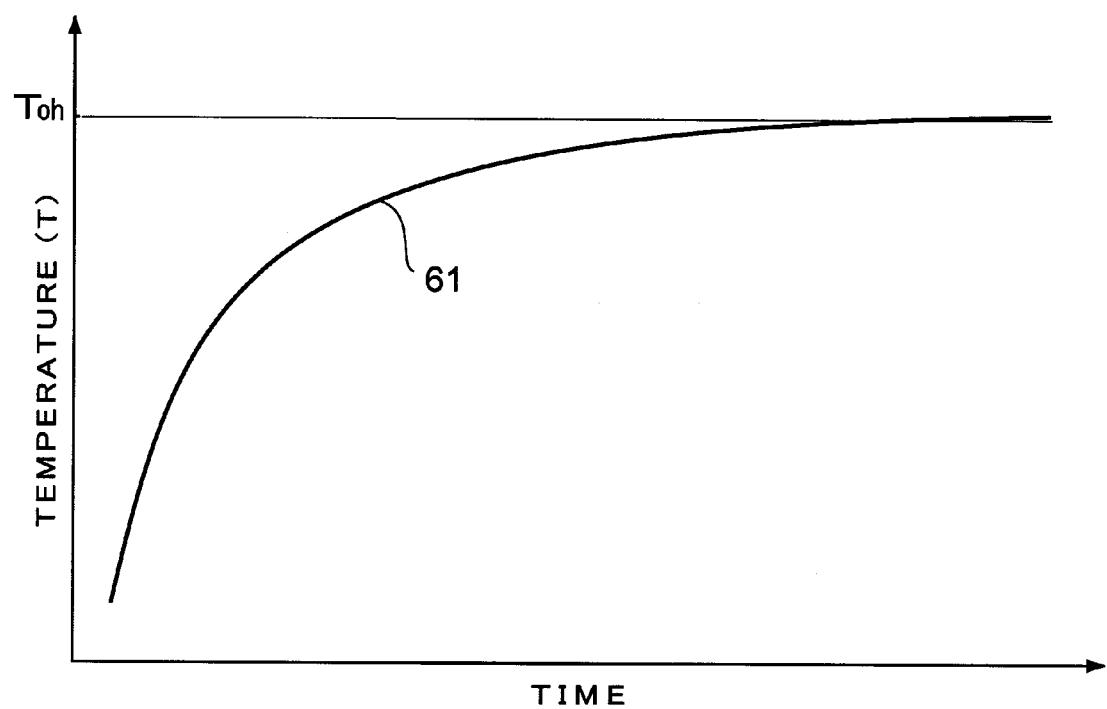
FIG. 9 is a characteristics curve diagram illustrating a characteristic when the temperature of the lubricant oil pooled in the wheel mounting case rises.

Next, FIGS. 8 and 9 show a second embodiment in accordance with the invention. In the second embodiment, the component elements that are identical to those of the foregoing first embodiment will be simply denoted by the same reference numerals to avoid repetitions of similar explanations.

The characteristic of the second embodiment lies in that a configuration is provided such that when it is determined that the temperature difference ΔT between the temperature T of the lubricant oil G detected by the temperature sensor 51 before stopping the lubricant pump 46 and the warning temperature Toh is within the range of the threshold value α, the "overheat" warning is issued after the lapse of a preset delay time.

Namely, in the control processing shown in FIG. 8, which is adopted in this embodiment, processing in Step 21 through Step 27 and Step 29 through 31 is carried out in the same way as the processing in Steps 1 to 10 (see FIG. 7) described in the first embodiment. Then, when "YES" is given in the determination processing in Step 31, and the temperature difference ΔT is within the range of the threshold value α, the operation proceeds to a next Step 32 to increment a counter C as "C←C+1".

In a next Step 33, a determination is made as to whether or not the count value of the counter C has reached a predetermined value C0 (for example, C0=100 to 300 seconds) corresponding to a predetermined delay time. Here, while "NO" is being given in the determination in Step 33, the aforementioned delay time (predetermined value C0) has not yet elapsed after the determination is made in Step 31 that the temperature difference ΔT is within the range of the threshold value α, so that the operation returns to Step 25 to continue the processing that follows.

Then, when, at the time of repeating the processing in and after Step 25, "YES" is given in the determination in Step 26 and the drive of the lubricant pump 46 is resumed in the next Step 27, the operation proceeds to the next Step 28 to reset the count value of the counter C to "0". Subsequently, the operation returns to Step 21 to continue the processing that follows.

On the other hand, when "YES" is given in the determination in Step 33, it is the case where the count value of the counter C has reached the predetermined value C0, and the delay time of C0=100 to 300 seconds has elapsed. Accordingly, the operation proceeds to a next Step 34 to issue the "overheat" warning, notifying the operator by the indicator 54 shown in FIG. 6 that the travel speed V of the vehicle should be lowered to a speed which is equal to or less than the determination speed V1. Subsequently, the operation returns to Step 25 to continue the processing that follows.

Namely, the present inventors were able to obtain the temperature change of the lubricant oil G pooled in the wheel mounting case 19 as the characteristic data indicated by a characteristic curve 61 shown in FIG. 9. In this case, in the state in which the drive of the lubricant pump 46 is stopped, the lubricant oil G in the wheel mounting case 19 rises up to a temperature close to the warning temperature Toh relatively early. However, as for the temperature T of the lubricant oil G, its ascending curve becomes gentle as it approaches the warning temperature Toh. Hence, it was confirmed that there is a time lag (delay time) until the warning temperature Toh is exceeded.

Therefore, in the second embodiment, even when the temperature difference ΔT between the temperature T of the lubricant oil G and the warning temperature Toh is within the range of the threshold value α, and the temperature T of the lubricant oil G has approached the warning temperature Toh, through the processing in Steps 32 and 33 in FIG. 8, the operation waits until the lapse of a time period until the count value of the counter C reaches the predetermined value C0 (for example, C0=a delay time of 100 to 300 seconds). Then, after the lapse of the delay time, the "overheat" warning is issued in this configuration.

As such, also in the second embodiment thus configured, it is possible to obtain an operational effect substantially similar to that of the foregoing first embodiment, and when the temperature difference ΔT is within the range of the predetermined threshold value α, the overheating of the vehicle can be prevented by issuing a warning. Moreover, in the second embodiment, it is possible to obtain the following operational effect since the warning is issued after the lapse of a predetermined delay time.

Namely, there is a possibility that an extra burden is imparted to the operator if a warning is immediately issued when the temperature difference ΔT is within the range of the threshold value α (for example, α=5° C. or thereabouts) despite the fact that the temperature T of the lubricant oil G is lower than the warning temperature Toh. However, in the second embodiment, as the operation waits until the count value of the counter C reaches the delay time of the predetermined value C0 and the warning is issued after the lapse of the delay time, a timely "overheat" warning can be provided to the operator, thereby making it possible to reliably alleviate the burden on the operator.

Figure 10:
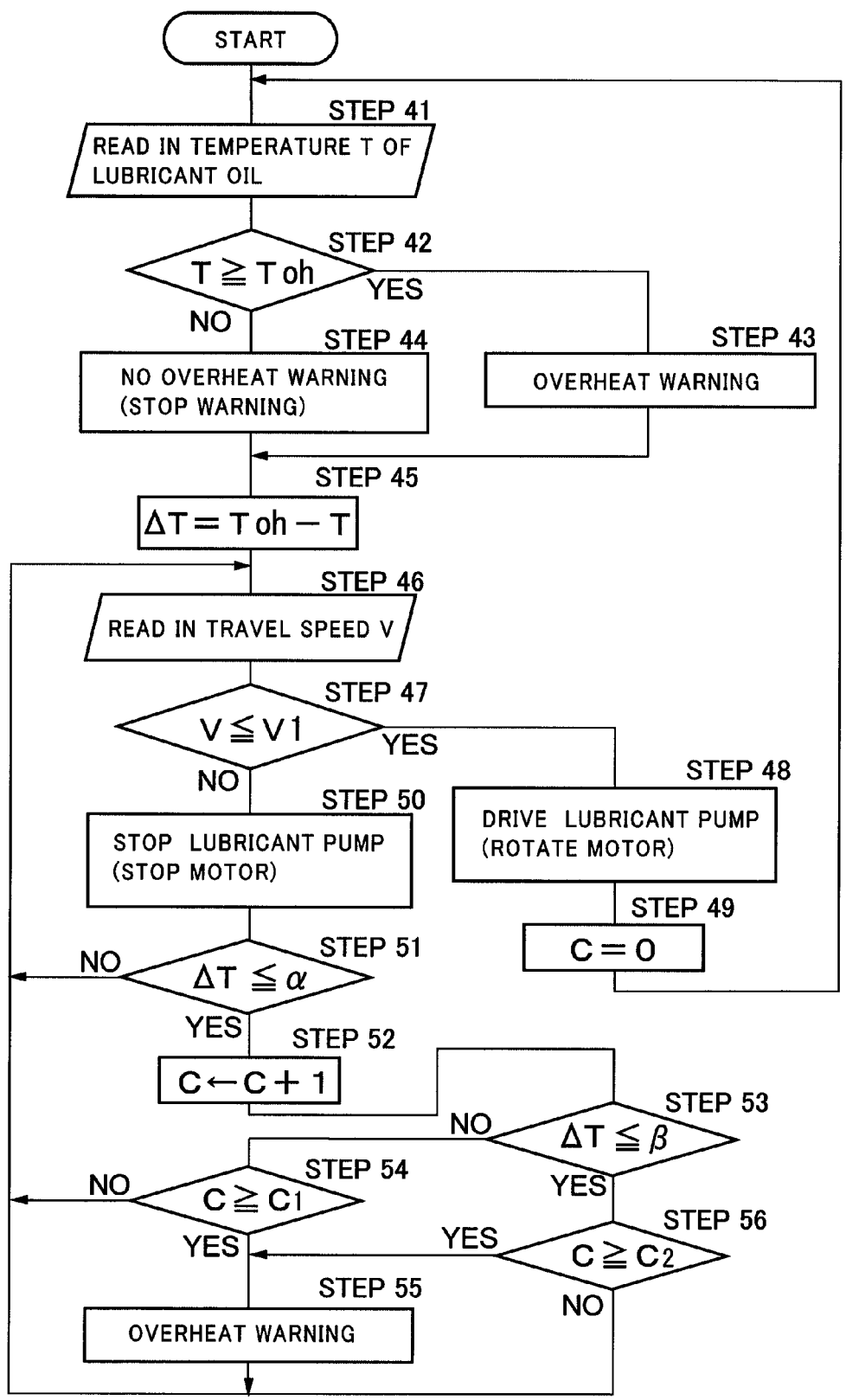
FIG. 10 is a flow chart of the supply control of the lubricant oil, overheat warning processing, and the like according to a third embodiment.

Next, FIG. 10 shows a third embodiment in accordance with the invention. In the third embodiment, the component elements that are identical to those of the foregoing first embodiment will be simply denoted by the same reference numerals to avoid the repetition of similar explanations.

The characteristic of the third embodiment lies in that a configuration is provided such that when the temperature difference ΔT falling within the range of the threshold value α is relatively large, the delay time until the "overheat" warning is issued is set to be long, whereas when the temperature difference ΔT is relatively small, the delay time is set to be short.

Namely, in the control processing shown in FIG. 10, which is adopted in this embodiment, processing in Step 41 through Step 44 is carried out in the same way as the above-described processing in Steps 1 to 4 (see FIG. 7) in the foregoing first embodiment. Then, in Step 45, the temperature difference ΔT between the temperature T of the lubricant oil G and the warning temperature Toh based on Step 41 is determined from the aforementioned Formula 1.

Next, processing in Steps 46 to 48 and Steps 50 and 51 is carried out in the same way as the Steps 5 to 10 (see FIG. 7) described in the foregoing first embodiment. Then, when "YES" is given in the determination processing in Step 51, and the temperature difference ΔT is within the range of the threshold value α, the operation proceeds to a next Step 52 to increment the counter C as "C←C+1".

In a next Step 53, a determination is made as to whether or not the temperature difference ΔT is within the range of another threshold value β. Here, the threshold value β is a value smaller than the aforementioned threshold value α (β<α), and in a case where the threshold value α is set to, for example, α=5° C., the threshold value β is set to β=3° C. or thereabouts. For this reason, when the temperature difference ΔT has become 5° C. or less and is greater than 3° C., "NO" is given in the determination in Step 53.

Then, in this case, in a next Step 54, a determination is made as to whether or not the count value of the counter C has reached a predetermined value C1 corresponding to a predetermined long delay time (for example, C1=a delay time of 300 seconds or thereabouts). In this instance, while "NO" is being given in the determination in Step 54, the delay time of C1=300 seconds has not yet elapsed after the determination is made by the processing in Steps 51 to 53 that the temperature difference ΔT is within the range of the threshold values β to α (β<ΔT≦α). In this case, therefore, the operation returns to Step 46 to continue the processing that follows.

Then, when, at the time of repeating the processing in and after Step 46, "YES" is given in the determination in Step 47 and the drive of the lubricant pump 46 is resumed in the next Step 48, the operation proceeds to the next Step 49 to reset the count value of the counter C to "0". Subsequently, the operation returns to Step 41 to continue the processing that follows.

On the other hand, when "YES" is given in the determination in Step 54, it is the case where the count value of the counter C has reached the predetermined value C1, so that the operation proceeds to a next Step 55 to issue the "overheat" warning. Namely, the operator is notified by the indicator 54 shown in FIG. 6 that the travel speed V of the vehicle should be lowered to a speed which is equal to or less than the determination speed V1. Subsequently, the operation returns to Step 46 to continue the processing that follows.

Meanwhile, when "YES" is given in the determination in Step 53, the temperature difference ΔT has become small to a level equal to or lower than the threshold value β (for example, (β=3° C.). Accordingly, in this case, in a next Step 56, a determination is made as whether or not the count value of the counter C has reached a predetermined value C2 corresponding to a predetermined short delay time (for example, C2=a delay time of 180 seconds or thereabouts). Further, "NO" is given in the determination in Step 56 until this delay time elapses, so that, in this case, the operation returns to Step 46 to repeat the processing that follows.

On the other hand, when "YES" is given in the determination in Step 56, it is the case where the temperature difference ΔT is within the threshold value β (ΔT≦β), and the delay time of the predetermined value C2 (for example, C2=180 seconds) has elapsed. Accordingly, in this case, the operation proceeds to Step 55 to issue the "overheat" warning. Namely, the operator is notified that the travel speed V of the vehicle should be lowered to a speed which is equal to or less than the determination speed V1. Subsequently, the operation returns to Step 46 to continue the processing that follows.

As such, also in the third embodiment thus configured, it is possible to obtain an operational effect substantially similar to those of the foregoing first and second embodiments. Moreover, in the third embodiment, the configuration provided is such that when the temperature difference ΔT falling within the range of the threshold value α is greater than the threshold value β (for example, β=3° C.), the delay time C1 is made longer up to C1=300 seconds or thereabouts, and when the temperature difference ΔT has become smaller to a level equal to or lower than β (ΔT≦β), the delay time C2 is set to be shorter down to C2=180 seconds or thereabouts.

In consequence, even when the temperature difference ΔT between the temperature T of the lubricant oil G and the warning temperature Toh is within the range of the threshold value α, the delay time can be set variably, depending on whether the temperature difference ΔT is relatively large or small. Then, when the respective delay times have elapsed, the overheat warning can be issued, and the operator can be notified of an overheat warning corresponding to the actual temperature of the lubricant oil.

Figure 11:
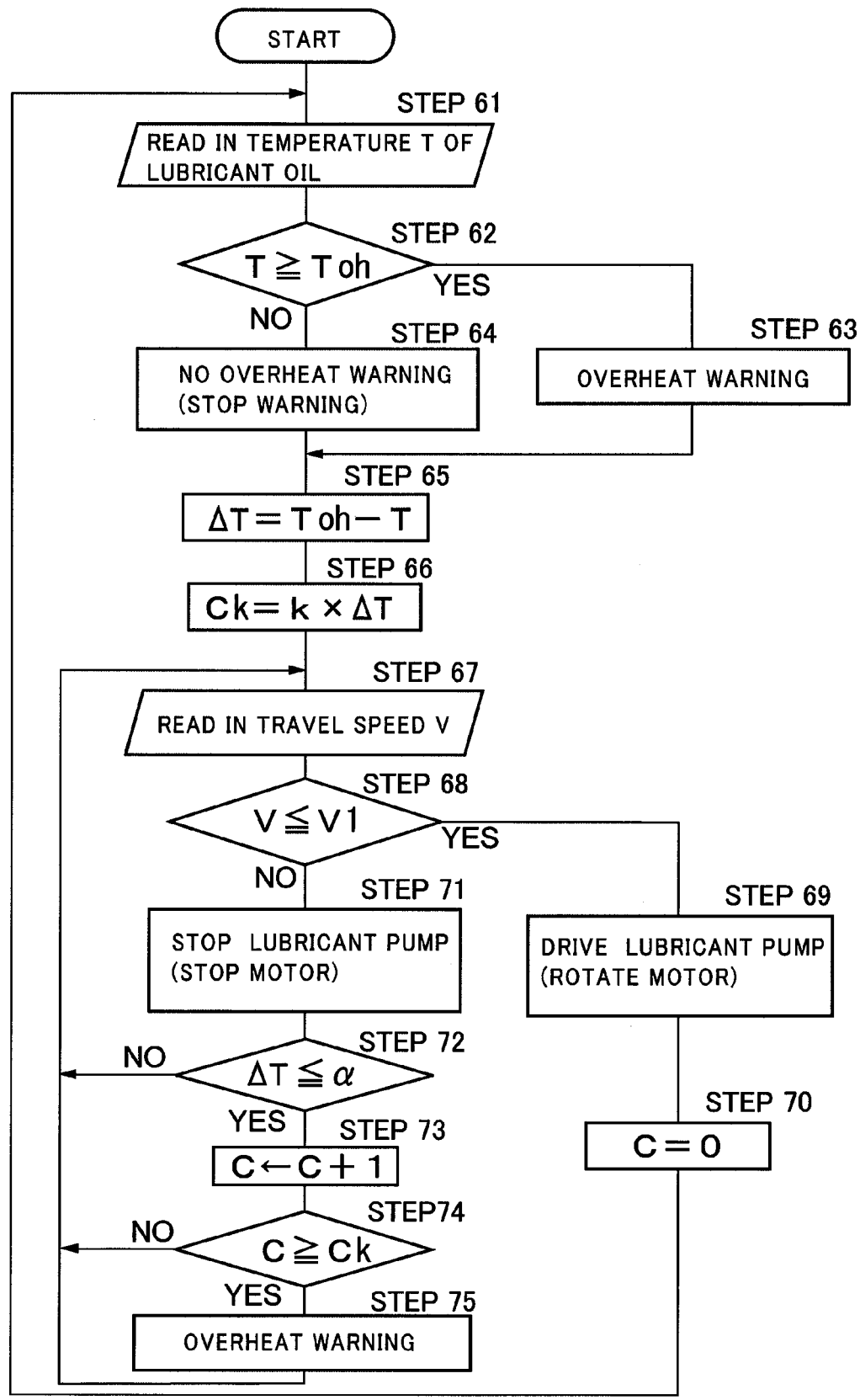
FIG. 11 is a flow chart of the supply control of the lubricant oil, overheat warning processing, and the like according to a fourth embodiment.

Next, FIG. 11 shows a fourth embodiment in accordance with the invention. In the fourth embodiment, the component elements that are identical to those of the foregoing first embodiment will be simply denoted by the same reference numerals to avoid repetitions of similar explanations.

The characteristic of the fourth embodiment lies in that a configuration is provided such that the delay time until the issuance of the "overheat" warning is set variably in accordance with the relative magnitude of the temperature difference ΔT (ΔT=Toh−T) which is within the range of the threshold value α.

Namely, in the control processing shown in FIG. 11, which is adopted in this embodiment, processing in Step 61 through Step 64 is carried out in the same way as the Steps 1 to 4 (see FIG. 7) described in the foregoing first embodiment. Then, in Step 65, the temperature difference ΔT between the temperature T of the lubricant oil G and the warning temperature Toh based on Step 61 is determined from the aforementioned Formula 1.

Then, in Step 66, a count value Ck which is incremented or decremented in accordance with the temperature difference ΔT is computed in accordance with Formula 3 below. This Formula 3, when expressed in a more concrete form as a linear function, can be computed as Formula 4 below.

$$Ck = f(\Delta T) \qquad \text{(Formula 3)}$$

$$Ck = k \times \Delta T \qquad \text{(Formula 4)}$$

In this case, the coefficient k in Formula 4 is set to a value corresponding to k=60 seconds, in one example. For this reason, in a case where the temperature difference ΔT is, for example, ΔT=3° C., the count value Ck is set to a count value corresponding to a delay time of Ck=180 seconds. Meanwhile, in a case where, for example, ΔT=5° C., the count value Ck is set to a count value corresponding to a delay time of Ck=300 seconds.

Next, processing in Steps 67 to 69 and Steps 71 and 72 is carried out in the same way as the Steps 5 to 10 (see FIG. 7) described in the foregoing first embodiment. Then, when "YES" is given in the determination processing in Step 72, and the temperature difference ΔT is within the range of the threshold value α, the operation proceeds to a next Step 73 to increment the counter C as "C←C+1".

In a next Step 74, a determination is made as to whether or not the count value of the counter C has reached the count value Ck corresponding to the delay time computed by Formula 4. Here, while "NO" is being given in the determination in Step 74, the delay time corresponding to, for example, the count value Ck has not yet elapsed after it is determined by the processing in Step 72 that the temperature difference ΔT is within the range of the threshold value α (ΔT≦α). In this case, therefore, the operation returns to Step 67 to continue the processing that follows.

Then, when, at the time of repeating the processing in and after Step 67, "YES" is given in the determination in Step 68 and the drive of the lubricant pump 46 is resumed in the Step 69, the operation proceeds to the next Step 70 to reset the count value of the counter C to "0". Subsequently, the operation returns to Step 61 to continue the processing that follows.

On the other hand, when "YES" is given in the determination in Step 74, it is the case where the count value of the counter C has reached the count value Ck (corresponding to the delay time) based on the aforementioned Formula 4, so that the operation proceeds to a next Step 75 to issue the "overheat" warning. Namely, the operator is notified by the indicator 54 shown in FIG. 6 that the travel speed V of the vehicle should be lowered to a speed which is equal to or less than the determination speed V1. Subsequently, the operation returns to Step 67 to continue the processing that follows.

As such, also in the fourth embodiment thus configured, it is possible to obtain an operational effect substantially similar to those of the foregoing first to third embodiments. Moreover, in the fourth embodiment, the configuration provided is such that the delay time (count value Ck) until the issuance of the "overheat" warning is set variably by the aforementioned Formula 3 or 4 in accordance with the relative magnitude of the temperature difference ΔT which is within the range of the threshold value α.

In consequence, even when the temperature difference ΔT between the temperature T of the lubricant oil G and the warning temperature Toh is within the range of the threshold value α, the delay time can be set variably, depending on whether the temperature difference ΔT is relatively large or small. Then, when the respective delay times have elapsed, the overheat warning can be issued, and the operator can be notified of an overheat warning corresponding to the actual temperature of the lubricant oil.

Figure 12:
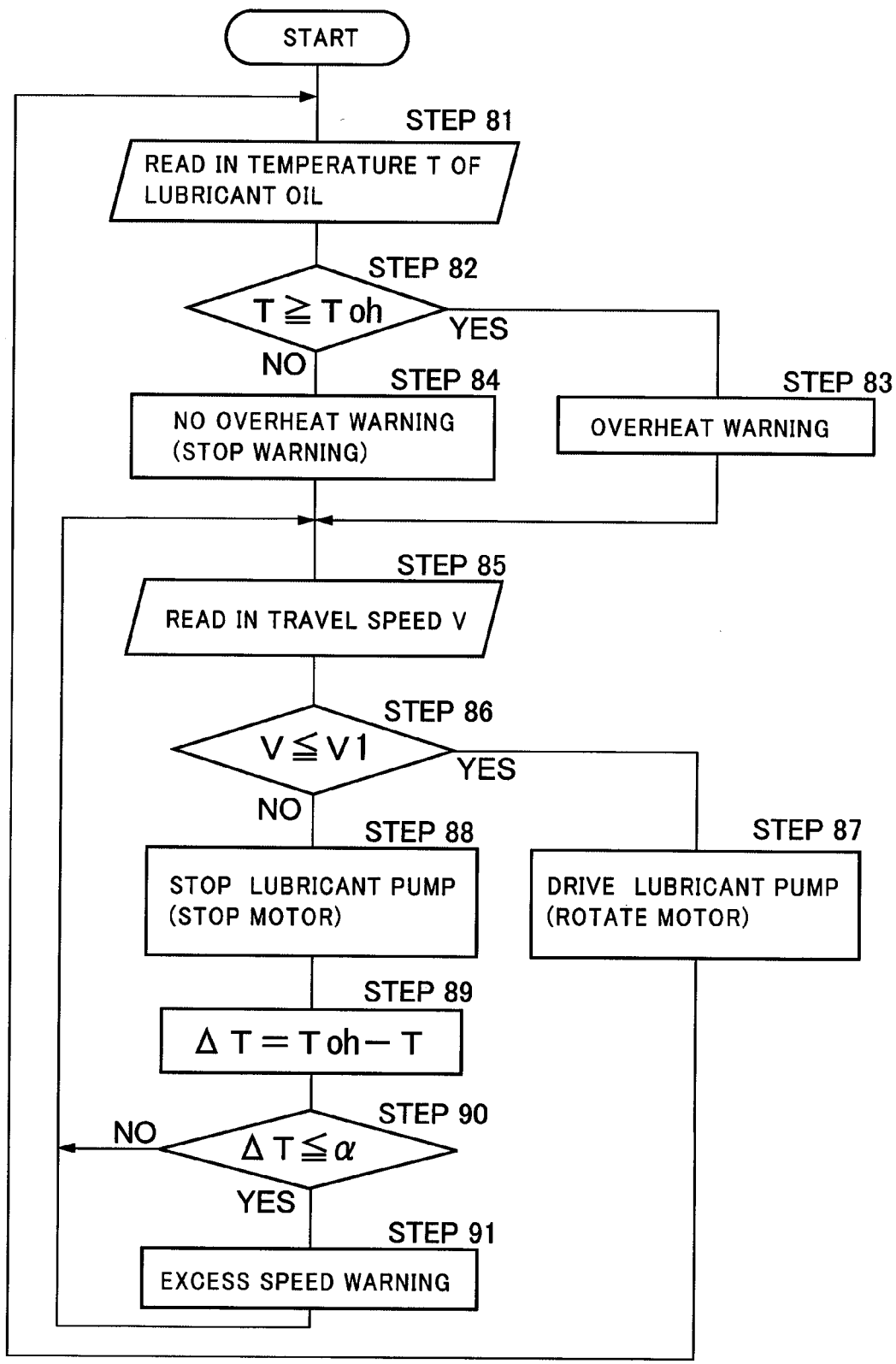
FIG. 12 is a flow chart of the supply control of the lubricant oil, excess speed warning processing, and the like according to a fifth embodiment.

Next, FIG. 12 shows a fifth embodiment in accordance with the invention. In the fifth embodiment, the component elements that are identical to those of the foregoing first embodiment will be simply denoted by the same reference numerals to avoid repetitions of similar explanations.

The characteristic of the fifth embodiment lies in that a configuration is provided such that when the temperature difference ΔT between the temperature T of the lubricant oil G detected by the temperature sensor 51 and the warning temperature Toh is within the range of the threshold value α, it is determined that the traveling state of the vehicle is not normal (namely, the travel speed V is too fast), and therefore an "excess speed" warning is issued.

Namely, in the control processing shown in FIG. 12, which is adopted in this embodiment, processing in Step 81 through Step 90 is carried out in the same way as the Steps 1 to 10 (see FIG. 7) described in the foregoing first embodiment.

However, this embodiment differs from the first embodiment in that when "YES" is given in the determination processing in Step 90 because the temperature difference ΔT is within the range of the threshold value α, the operation proceeds to a next Step 91 to issue an "excess speed" warning.

As such, also in the fifth embodiment thus configured, it is possible to obtain an operational effect substantially similar to that of the foregoing first embodiment, and when the temperature difference ΔT is within the predetermined range of the threshold value α, a warning is issued to allow the operator to be notified that the traveling vehicle is in a state of "excess speed".

In addition, this also applies similarly to the foregoing second to fourth embodiments. For instance, in the case of the second embodiment, a configuration may be provided in which the "excess speed warning" in substitution of the "overheat warning" is issued in the processing in Step 34 shown in FIG. 8. Further, in the case of the third embodiment, a configuration may be provided in which the "excess speed warning" in substitution of the "overheat warning" is issued in the processing in Step 55 shown in FIG. 10. Furthermore, in the case of the fourth embodiment, a configuration may be provided in which the "excess speed warning" in substitution of the "overheat warning" is issued in the processing in Step 75 shown in FIG. 11.

It should be noted that, in the foregoing first embodiment, in the control processing shown in FIG. 7, the processing in Step 8 shows a specific example of a motor stop means, which is a constituent requirement of the present invention, the determination processing in Step 10 shows a specific example of a temperature difference determination means, which is another constituent requirement of the present invention, and the processing in Step 11 shows a specific example of a warning signal output means, which is still another constituent requirement of the present invention.

Similarly, in the foregoing second embodiment, in the control processing shown in FIG. 8, the processing in Step 29 shows a specific example of a motor stop means, the determination processing in Step 31 shows a specific example of the temperature difference determination means, the processing in Steps 32 and 33 shows a specific example of a delay time set means, which is still another constituent requirement of the invention, and the processing in Step 34 shows a specific example of the warning signal output means. Meanwhile, in the foregoing third embodiment, in the control processing shown in FIG. 10, the processing in Step 50 shows a specific example of the motor stop means, the determination processing in Steps 51 and 53 shows a specific example of the temperature difference determination means, the processing in Steps 52, 54, and 56 shows a specific example of the delay time set means, and the processing in Step 55 shows a specific example of the warning signal output means.

Meanwhile, in the foregoing fourth embodiment, in the control processing shown in FIG. 11, the processing in Step 71 shows a specific example of the motor stop means, the determination processing in Step 72 shows a specific example of the temperature difference determination means, the processing in Steps 66, 73, and 74 shows a specific example of the delay time set means, and the processing in Step 75 shows a specific example of the warning signal output means. In addition, in the foregoing fifth embodiment, in the control processing shown in FIG. 12, the processing in Step 88 shows a specific example of the motor stop means, the determination processing in Step 90 shows a specific example of the temperature difference determination means, and the processing in Step 91 shows a specific example of the warning signal output means.

In addition, in the each foregoing embodiment, by way of an example, the temperature sensor 51 is provided on the output side of the lubricant pump 46. However, the present invention is not limited to this particular example. For instance, a configuration may be adopted in which a temperature sensor 51' is provided on the suction side of the lubricant pump 46, as shown by the two-dot chain line in FIG. 4.

In the foregoing first embodiment, byway of example, the reduction gear mechanism is constituted by two-stage planetary gear reduction mechanisms consisting of the first-stage planetary gear reduction mechanism 23 and the second-stage planetary gear reduction mechanism 31. However, needless to say, the present invention is not limited to this particular example. For instance, there may be employed a reduction gear mechanism of a single stage or of more than three stages.

Further, in the foregoing first embodiment, by way of example, the speed sensor 52 for detecting the rotational speed of the rear wheel 7 is provided on the wheel drive motor 17 and the rotational speed of the rotational shaft 18 is detected as the rotational speed of the rear wheel 7. However, the present invention is not limited to this particular example. For instance, arrangements may be adopted such that, the rotation of the rear wheel 7 is directly detected, or the rotation of the wheel mounting case 19 is detected. Namely, the speed sensor to be employed in the present invention suffices as long as it can detect the rotational speed of a wheel (rear wheel 7) either directly or indirectly.

Further, in the foregoing embodiments, byway of example, the wheel drive motor 17 constituted by the pump drive motor 47 is employed as the drive source. However, the present invention is not limited to this particular example. For instance, a hydraulic motor or the like, may be employed as the drive source of the travel drive apparatus, if desired.

On the other hand, in the foregoing embodiments, by way of an example, the "overheat warning", the "excess speed warning", or the like is issued by the indicator 54 illustrated in FIG. 6. However, the present invention is not limited to this particular example. For instance, a configuration may be provided in which an abnormality notification of such as the "overheat warning" or the "excess speed warning" is issued to the operator by using such as a voice synthesizer, an alarm buzzer or lamp, or the like.

Furthermore, in the foregoing embodiments, a description has been given by citing as an example the dump truck 1 of the rear wheel drive system as a working vehicle. However, the present invention is not limited to this particular example, and may be applied to a dump truck of the front wheel drive system or the four-wheel drive system in which both front and rear wheels are driven, or may be applied to a working vehicle other than the dump truck having traveling wheels.

What is claimed is:

1. A travel drive apparatus for a working vehicle, comprising:
   a tubular wheel mounting case provided on a working vehicle and rotating integrally with a wheel;
   a reduction gear mechanism provided in said wheel mounting case to reduce the speed of rotation of a drive source and transmit it to said wheel mounting case;
   lubricant oil circulation means for supplying a lubricant oil to said reduction gear mechanism;
   a temperature sensor for detecting a temperature (T) of said lubricant oil; and
   a speed sensor for detecting a rotational speed (V) of said wheel, characterized in that;
   said lubricant oil circulation means being constituted by an electric motor, a lubricant pump for forcibly circulating the lubricant oil pooled in said wheel mounting case by being driven by said electric motor, and control means for controlling the drive and stop of said electric motor in accordance with the rotational speed (V) of said wheel,
   said control means comprising:
   motor stop means for stopping the drive of said electric motor when the speed (V) of said wheel detected by said speed sensor has become faster than a predetermined determination speed (V1);
   temperature difference determination means for comparing the temperature (T) of said lubricant oil detected by said temperature sensor and a predetermined warning temperature (Toh) and determining whether or not a temperature difference ($\Delta T$) between them is within a range of a predetermined threshold value ($\alpha$, $\beta$) when said electric motor is stopped by said motor stop means; and
   warning signal output means for outputting a signal for warning that a temperature state of said lubricant oil or a traveling state is not normal, when it is determined by said temperature difference determination means that said temperature difference ($\Delta T$) is within the range of the threshold value ($\alpha$, $\beta$).

2. The travel drive apparatus for a working vehicle according to claim 1, wherein said control means is configured to resume the drive of said electric motor when the speed (V) of said wheel has been lowered to a speed which is equal to or less than said determination speed (V1) in accordance with the warning by said warning signal output means.

3. The travel drive apparatus for a working vehicle according to claim 1, wherein said control means further comprises:
delay time set means for setting a predetermined delay time (C0, C1, C2, Ck) when it is determined by said temperature difference determination means that said temperature difference ($\Delta T$) is within the range of the threshold value ($\alpha$, $\beta$), and said warning signal output means is configured to issue said warning after the lapse of the delay time (C0, C1, C2, Ck) set by said delay time set means.

4. The travel drive apparatus for a working vehicle according to claim 3, wherein said delay time set means is configured to set said delay time (Ck, C1) to be long when said temperature difference ($\Delta T$) falling within said threshold value ($\alpha$) is large, and is configured to set said delay time (Ck, C2) to be short when said temperature difference ($\Delta T$) is small.

5. The travel drive apparatus for a working vehicle according to claim 1, wherein said warning signal output means outputs a warning signal to warn that the temperature (T) of said lubricant oil is in an overheated state.

6. The travel drive apparatus for a working vehicle according to claim 1, wherein said warning signal output means outputs a warning signal to warn that the travel speed (V) of the vehicle is in a state of excess speed.

7. The travel drive apparatus for a working vehicle according to claim 1, wherein a tubular axle housing extending in left and right directions is provided on a lower portion of a vehicle body for constituting said working vehicle, a pair of said wheel mounting cases are respectively provided rotatably on outer peripheral sides of both end sides in the left and right directions of said axle housing, and said lubricant oil is pooled at a lower position in each of said wheel mounting cases.

8. The travel drive apparatus for a working vehicle according to claim 1, wherein said lubricant oil circulation means includes a suction pipe for sucking the lubricant oil in said wheel mounting case by said lubricant pump and a supply pipe for supplying and circulating the lubricant oil sucked by said lubricant pump into an interior of said wheel mounting case; and said suction pipe extends from an interior of said axle housing into the interior of said wheel mounting case, its suction port being opened in the lubricant oil pooled at a lower position of said wheel mounting case.

9. The travel drive apparatus for a working vehicle according to claim 2, wherein said warning signal output means outputs a warning signal to warn that the temperature (T) of said lubricant oil is in an overheated state.

10. The travel drive apparatus for a working vehicle according to claim 3, wherein said warning signal output means outputs a warning signal to warn that the temperature (T) of said lubricant oil is in an overheated state.

11. The travel drive apparatus for a working vehicle according to claim 4, wherein said warning signal output means outputs a warning signal to warn that the temperature (T) of said lubricant oil is in an overheated state.

12. The travel drive apparatus for a working vehicle according to claim 2, wherein said warning signal output means outputs a warning signal to warn that the travel speed (V) of the vehicle is in a state of excess speed.

13. The travel drive apparatus for a working vehicle according to claim 3, wherein said warning signal output means outputs a warning signal to warn that the travel speed (V) of the vehicle is in a state of excess speed.

14. The travel drive apparatus for a working vehicle according to claim 4, wherein said warning signal output means outputs a warning signal to warn that the travel speed (V) of the vehicle is in a state of excess speed.

* * * * *